United States Patent
Rhee et al.

(10) Patent No.: US 10,909,347 B2
(45) Date of Patent: Feb. 2, 2021

(54) METHOD AND APPARATUS WITH FINGERPRINT VERIFICATION

(71) Applicant: SAMSUNG ELECTRONICS CO., LTD., Suwon-si (KR)

(72) Inventors: Seon Min Rhee, Seoul (KR); Kyuhong Kim, Seoul (KR); Hana Lee, Suwon-si (KR); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/890,462

(22) Filed: Feb. 7, 2018

(65) Prior Publication Data

US 2018/0268196 A1    Sep. 20, 2018

(30) Foreign Application Priority Data

Mar. 14, 2017  (KR) .................. 10-2017-0031889
Jul. 31, 2017   (KR) .................. 10-2017-0097033

(51) Int. Cl.
    *G06K 9/00*    (2006.01)
    *G06K 9/68*    (2006.01)
    (Continued)

(52) U.S. Cl.
    CPC ..... *G06K 9/00067* (2013.01); *G06K 9/00026* (2013.01); *G06K 9/00087* (2013.01);
    (Continued)

(58) Field of Classification Search
    CPC .. G06K 9/00067; G06K 9/68; G06K 9/00026; G06K 9/6215; G06K 9/522; G06K 9/6296; G06K 9/00087; G06F 21/32
    See application file for complete search history.

(56) References Cited

U.S. PATENT DOCUMENTS

| 7,616,787 | B2* | 11/2009 | Boshra ............... G06K 9/00026 382/124 |
| 9,117,145 | B2  | 8/2015  | Boshra |

(Continued)

FOREIGN PATENT DOCUMENTS

| EP | 3 113 072 A1   | 1/2017 |
| JP | 2003-216952 A  | 7/2003 |

(Continued)

OTHER PUBLICATIONS

Zanganeh, Omid et al., "Partial Fingerprint Matching through Region-Based Similarity", *2014 International Conference on Digital Image Computing: Techniques and Applications (DICTA)*, 2014 (8 pages in English).

(Continued)

*Primary Examiner* — Phuoc Tran
(74) *Attorney, Agent, or Firm* — NSIP Law

(57) ABSTRACT

A fingerprint verification method and apparatus is disclosed. The fingerprint verification method may include obtaining an input fingerprint image, determining a matching region between the input fingerprint image and a registered fingerprint image, determining a similarity corresponding to the matching region, representing a determined indication of similarities between the input fingerprint image and the registered fingerprint image, relating the determined similarity to the matching region as represented in a matching region-based similarity, determining a result of a verification of the input fingerprint image based on the matching region-based similarity, and indicating the result of the verification.

11 Claims, 13 Drawing Sheets

(51) Int. Cl.
*G06K 9/62* (2006.01)
*G06K 9/52* (2006.01)

(52) U.S. Cl.
CPC .......... *G06K 9/522* (2013.01); *G06K 9/6215* (2013.01); *G06K 9/6296* (2013.01); *G06K 9/68* (2013.01)

(56) References Cited

U.S. PATENT DOCUMENTS

2016/0307023 A1    10/2016  Kim et al.
2017/0185821 A1*    6/2017  Chen .................. G06K 9/00093
2018/0018499 A1*    1/2018  Lei .................... G06K 9/00067

FOREIGN PATENT DOCUMENTS

| JP | 2003-323618 A | 11/2003 |
| JP | 3858391 B2 | 12/2006 |
| KR | 10-1639404 B1 | 7/2016 |
| KR | 10-2017-0003348 A | 1/2017 |
| KR | 10-2017-0003361 A | 1/2017 |
| WO | WO 2005/034021 A1 | 4/2005 |
| WO | WO 2011/022212 A1 | 2/2011 |

OTHER PUBLICATIONS

Extended European Search Report dated Jul. 13, 2018 in corresponding European Patent Application No. 18155850.3 (9 pages in English).

* cited by examiner

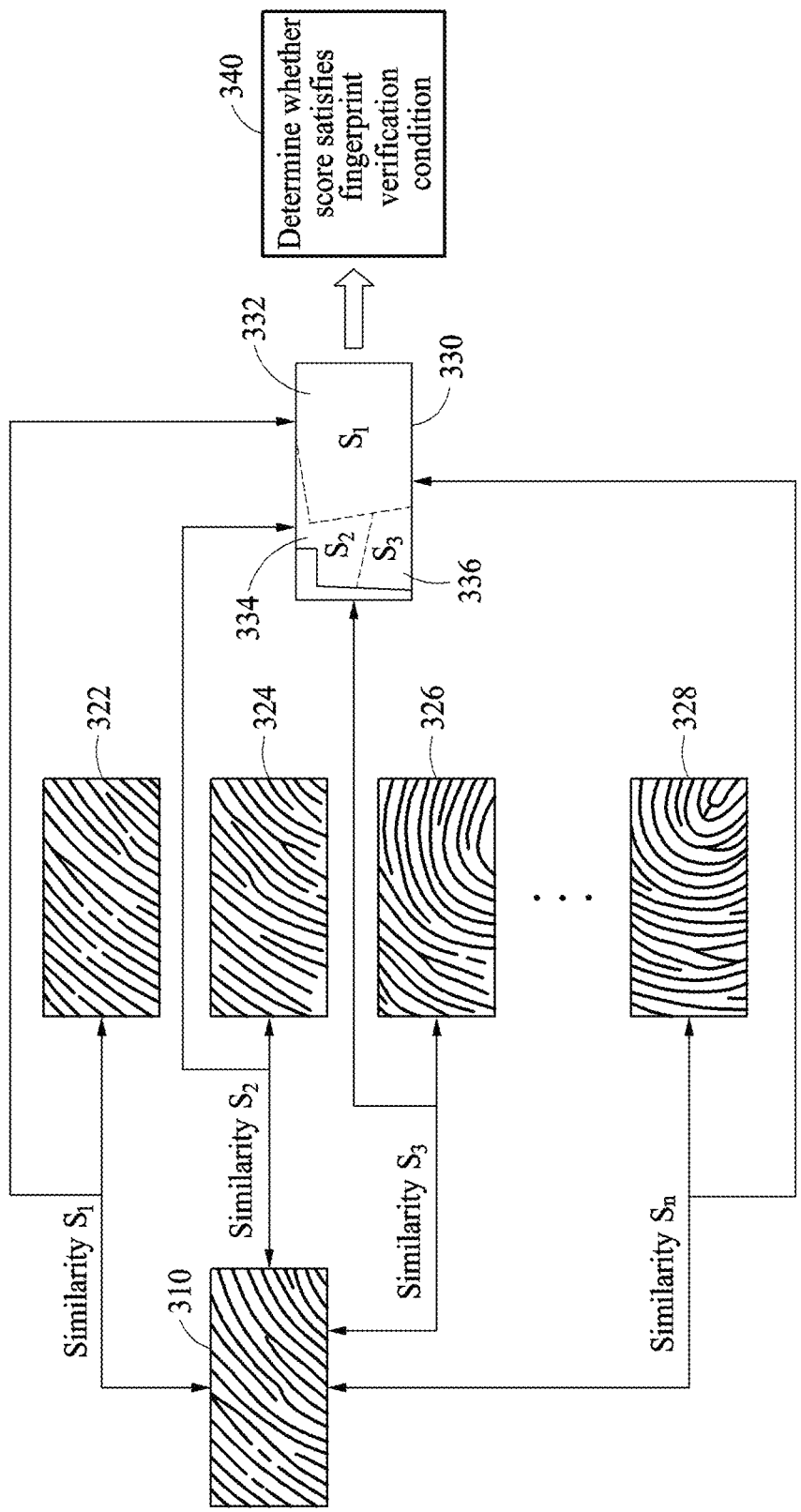

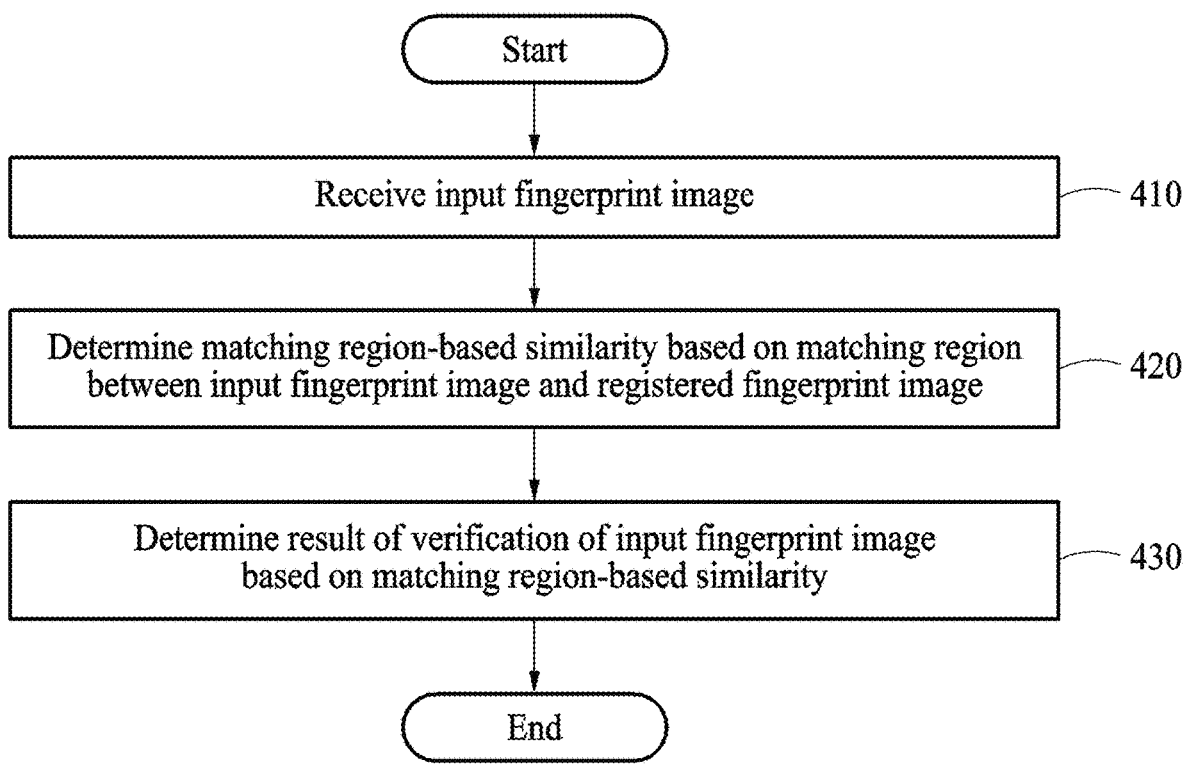

FIG. 8
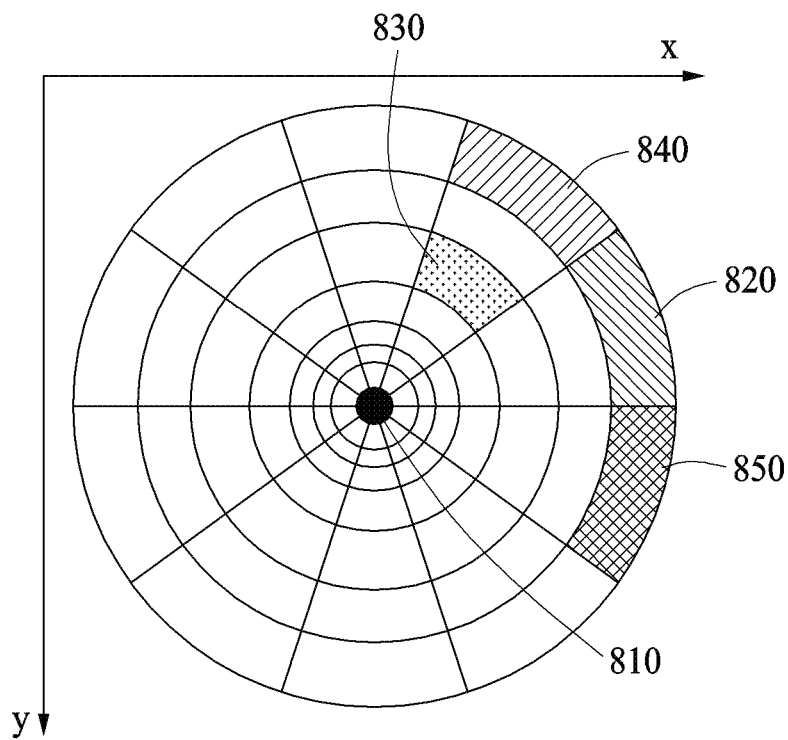
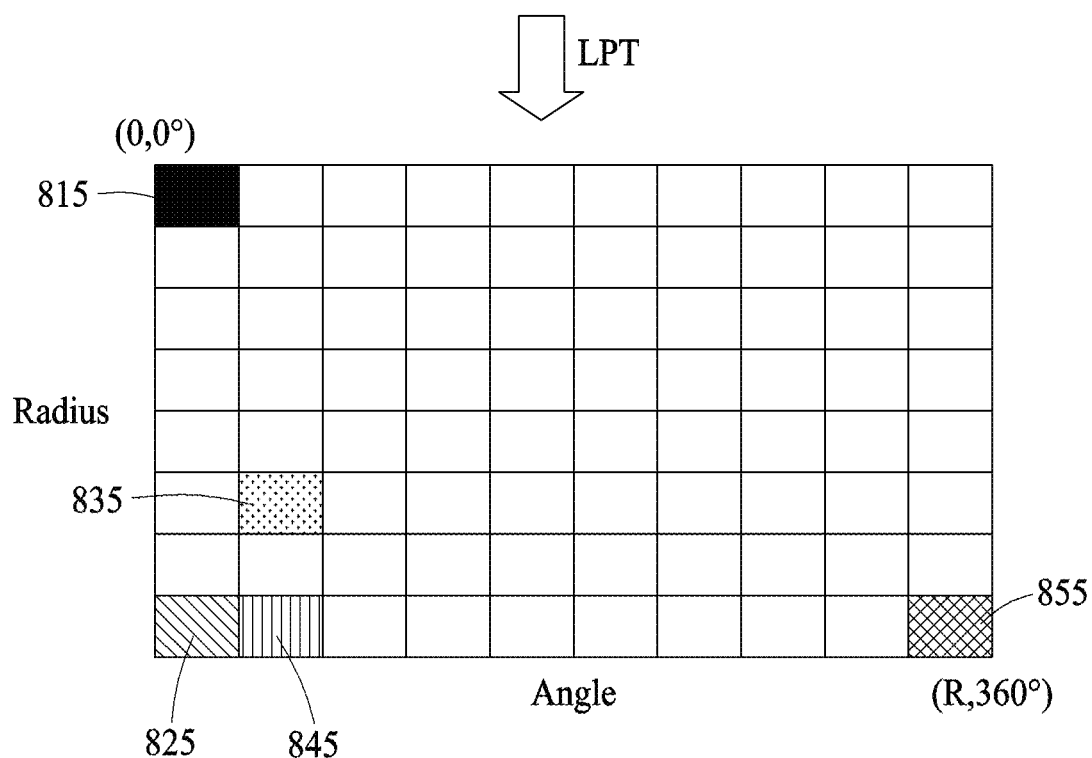

METHOD AND APPARATUS WITH FINGERPRINT VERIFICATION

CROSS-REFERENCE TO RELATED APPLICATION(S)

This application claims the benefit under 35 USC § 119(a) of Korean Patent Application No. 10-2017-0031889 filed on Mar. 14, 2017 and Korean Patent Application No. 10-2017-0097033 filed on Jul. 31, 2017 in the Korean Intellectual Property Office, the entire disclosures of which are incorporated herein by reference for all purposes.

BACKGROUND

1. Field

The following description relates to fingerprint verification technology.

2. Description of Related Art

Automated biometrics-based verification technologies may be used to verify a user, for example, through analyses of a fingerprint, an iris, a voice, a face, and/or blood vessels. Such biological characteristics used for user authentication differ from individual to individual, rarely change during a user's lifetime, and have a low risk of being stolen or copied. In addition, because individuals always carry such characteristic information, the individuals do not need to remember to or intentionally carry any corresponding identification materials, and thus may not suffer an inconvenience when performing verifications with the biological characteristics. Currently, fingerprint verification approaches has been used for the user authentication, e.g., due to their high level of convenience, security, and economic efficiency.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a processor implemented fingerprint verification method includes obtaining an input fingerprint image, determining a matching region between the input fingerprint image and a registered fingerprint image, determining a similarity corresponding to the matching region, representing a determined indication of similarities between the input fingerprint image and the registered fingerprint image, relating the determined similarity to the matching region as represented in a matching region-based similarity, determining a result of a verification of the input fingerprint image based on the matching region-based similarity, and indicating the result of the verification.

The relating of the determined similarity to the matching region as represented in the matching region-based similarity may include determining the matching region-based similarity based on the matching region and the determined similarity.

The method may further include generating the matching region-based similarity to include default similarity values and without representing a matching region, where the determining of the matching region-based similarity may include representing the matching region in the matching region-based similarity and changing, from the default similarity values, similarity values corresponding to the matching region represented in the matching region-based similarity to be the determined similarity.

The determining of the result of the verification may include determining a score for the determined matching region-based similarity, and determining whether the verification is successful based on whether the score satisfies a predetermined fingerprint verification condition.

The determining of the similarity corresponding to the matching region may include determining a first similarity corresponding to a first matching region between the input fingerprint image and a first registered fingerprint image, the relating of the determined similarity to the matching region as represented in the matching region-based similarity may include determining the matching region-based similarity based on the first similarity and the first matching region, and, in response to a score determined based on the determined matching region-based similarity not satisfying a fingerprint verification condition, the fingerprint verification method may further include determining a second similarity corresponding to a determined second matching region between the input fingerprint image and a second registered fingerprint image.

The determining of the matching region-based similarity based on the first similarity and the first matching region may include allocating the first similarity to the first matching region as represented in the determined matching region-based similarity.

In response to the score determined based on the determined matching region-based similarity not satisfying the fingerprint verification condition, the fingerprint verification method may further include updating the determined matching region-based similarity based on the second matching region and the second similarity.

The updating of the determined matching region-based similarity based on the second matching region and the second similarity may include, in response to an overlapping region being present between the first matching region and the second matching region, allocating or maintaining a greatest similarity between the first similarity and the second similarity to the overlapping region as represented in the updated matching region-based similarity.

The updating of the determined matching region-based similarity based on the second matching region and the second similarity may further include allocating the second similarity to a remaining region of the second matching region, in which the overlapping region is not reflected, as represented in the updated matching region-based similarity.

The determining of the result of the verification may include determining a score for the matching region-based similarity, and, in response to the score satisfying a predetermined fingerprint verification condition, determining that the verification of the input fingerprint image is successful.

The determining of the result of the verification may include determining whether a total size of one or more matching regions, each having similarities meeting a predetermined threshold value, meets a predetermined threshold size using a matching region-based similarity representing plural matching regions with respect to plural registered fingerprint images, and determining whether the verification of the input fingerprint image is successful based on a result of the determining of whether the total size meets the predetermined threshold size.

The determining of the result of the verification may include, in response to an average similarity value, of similarity values respectively related to at least some of plural matching regions represented in a matching region-based similarity with respect to plural registered fingerprint images, meeting a predetermined threshold value, determining that the verification of the input fingerprint image is successful.

The at least some of the plural matching regions may be less than all of the plural matching regions represented in the matching region-based similarity.

The determining of the result of the verification may further include, in response to a score determined based on the matching region-based similarity determined with respect to all registered fingerprint images not satisfying the predetermined fingerprint verification condition, determining that the verification of the input fingerprint image is unsuccessful.

In one general aspect, provided is a non-transitory computer-readable medium storing instructions, which when executed by a processor, cause the processor to perform one or more or all processes or methods described herein.

In one general aspect, a processor implemented fingerprint verification method includes obtaining an input fingerprint image, determining a first similarity corresponding to a first matching region between the input fingerprint image and a first registered fingerprint image, determining a matching region-based similarity based on the first similarity and the first matching region, determining a score based on the matching region-based similarity, in response to the score not satisfying a predetermined fingerprint verification condition, determining a second similarity corresponding to a second matching region between the input fingerprint image and a second registered fingerprint image and updating the matching region-based similarity based on the second similarity and the second matching region, and determining a result of a verification of the input fingerprint image based on the matching region-based similarity or the updated matching region-based similarity.

The updating of the matching region-based similarity may include, in response to an overlapping region being present between the first matching region and the second matching region, allocating or maintaining a greatest similarity between the first similarity and the second similarity to the overlapping region represented in the updated matching region-based similarity.

The updating of the matching region-based similarity may further include allocating the second similarity to a remaining region, of the second matching region in which the overlapping region is not reflected, as represented in the updated the updated matching region-based similarity.

The determining of the result of the verification may include determining whether a total size of one or more matching regions, each having a similarity meeting a predetermined threshold value, meets a predetermined threshold size using a matching region-based similarity representing plural matching regions with respect to plural registered fingerprint images including the first registered fingerprint image and the second registered fingerprint image, and determining whether the verification of the input fingerprint image is successful based on a result of the determining of whether the total size meets the predetermined threshold size.

The determining of the result of the verification may include, in response to an similarity average value, of similarity values respectively related to at least some of plural matching regions represented in a matching region-based similarity with respect to plural registered fingerprint images including the first registered fingerprint image and the second registered fingerprint image, meeting a predetermined threshold value, determining that the verification of the input fingerprint image is successful.

In one general aspect, a processor implemented fingerprint verification method includes obtaining an input fingerprint image, determining a first matching region between the input fingerprint image and a first registered fingerprint image, determining a first similarity corresponding to the first matching region, determining a matching region-based similarity based on the first similarity and the first matching region, determining a second matching region between the input fingerprint image and a second registered fingerprint image, determining a second similarity corresponding to the second matching region, updating the matching region-based similarity based on the second similarity and the second matching region, determining a score based on a finally updated matching region-based similarity representing plural matching regions with respect to plural registered fingerprint images including the first registered fingerprint image and the second registered fingerprint image, and determining a result of a verification of the input fingerprint image based whether on the score meets a predetermined verification condition.

The updating of the matching region-based similarity may include, in response to an overlapping region being present between the first matching region and the second matching region, allocating or maintaining a greatest similarity, between the first similarity corresponding to the first matching region and the second similarity corresponding to the second matching region, to the overlapping region represented in the updated matching region-based similarity.

The updating of the matching region-based similarity may further include allocating the second similarity to a remaining region, of the second matching region in which the overlapping region is not reflected, as represented in the updated matching region-based similarity.

The determining of the result of the verification may include determining whether a total size of one or more matching regions, each having a similarity meeting a predetermined threshold value, meets a predetermined threshold size using the finally updated matching region-based similarity, and determining whether the verification of the input fingerprint image is successful based on a result of the determining of whether the total size meets the predetermined threshold size.

The determining of the result of the verification may include, in response to a similarity average value, of similarity values respectively related to at least some of the plural matching regions represented in the finally updated matching region-based similarity, meeting a predetermined threshold value, determining that the verification of the input fingerprint image is successful.

In one general aspect, a processor implemented fingerprint verification method includes obtaining an input fingerprint image, incrementally updating a matching region-based similarity respectively based on determined similarities for respectively determined matching regions between the input fingerprint image and each of plural registered fingerprint images, determining respective scores with respect to each of one or more of the incremental updatings of the matching region-based similarity, or a final score based on a finally updated matching region-based similarity representing plural matching regions with respect to at least a multiple of the plural registered fingerprint images, determining a result of a verification of the input fingerprint image based whether any of the respective scores or the final score meets a predetermined verification condition, and indicating the determined result of the verification.

The determining of the respective scores with respect to each of one or more of the incremental updatings of the matching region-based similarity may cease when a corresponding score, of the respective scores, is determined in the determining of the result of the verification as meeting the predetermined verification condition.

In one general aspect, a fingerprint verification apparatus includes a processor configured to determine a matching region between an input fingerprint image and a registered fingerprint image, determine a similarity corresponding to the matching region, representing a determined indication of similarities between the input fingerprint image and the registered fingerprint image, relate the determined similarity to the matching region as represented in a matching region-based similarity, determine a result of a verification of the input fingerprint image based on the matching region-based similarity, and indicate the result of the verification.

The processor may be further configured to determine the matching region-based similarity based on the matching region between the input fingerprint image and the registered fingerprint image and the similarity corresponding to the matching region between the input fingerprint image and the registered fingerprint image.

The processor may be further configured to determine a score based on the updated matching region-based similarity, and determine the result of the verification based on whether the score satisfies a predetermined fingerprint verification condition.

Other features and aspects will be apparent from the following detailed description, the drawings, and the claims.

BRIEF DESCRIPTION OF THE DRAWINGS

FIG. 3 is a diagram illustrating an example of a fingerprint verification method.

FIG. 4 is a flowchart illustrating an example of a fingerprint verification method.

FIGS. 7 through 9 are diagrams illustrating an example of a method of determining a similarity between an input fingerprint image and a registered fingerprint image.

Figure 1:
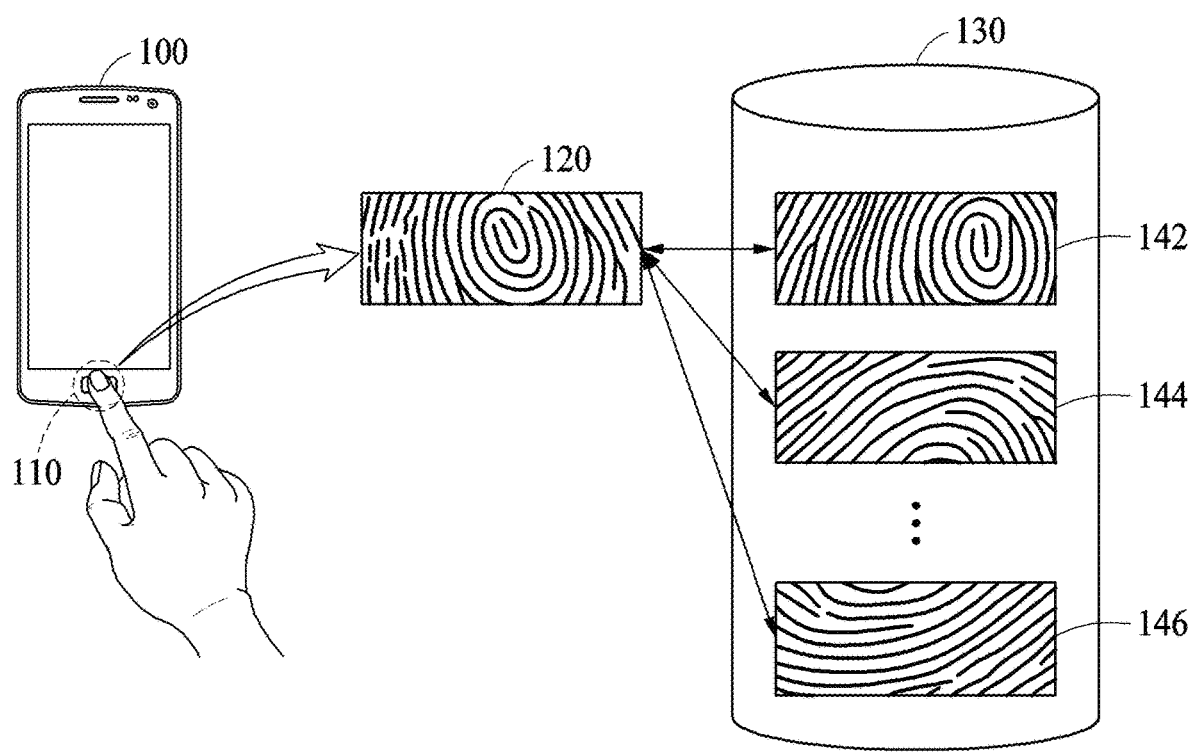
FIG. 1 is a diagram illustrating an example of a fingerprint verification method.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components in an example embodiment, but do not preclude the presence or addition of one or more other features, integers, operations, elements, components, and/or groups thereof in alternative embodiments, nor the lack of such stated features, integers, operations, elements, components, and/or combinations/groups thereof in further alternative embodiments unless the context and understanding of the present disclosure indicates otherwise. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a fingerprint verification method.

A fingerprint verification refers to a verification method used to determine whether a user attempting at a verification using a fingerprint is a valid user or not in user log-in, payment systems, and/or access control, as non-limiting examples. Referring to FIG. 1, a fingerprint verification apparatus configured to perform such a fingerprint verification is also represented by, or included in, a computing apparatus 100. The computing apparatus 100 includes, for example, a smartphone, a wearable device, a tablet computer, a netbook, a laptop computer, a desktop computer, a personal digital assistant (PDA), a set-top box, a home appliance, a biometrics-based door lock, a security device, and a vehicle start device. One or more processors of the computing apparatus 100 may be configured to perform the fingerprint verification. As another example, FIGS. 12 and 13 also demonstrate such computing apparatus examples.

For example, the computing apparatus 100 may determine whether a user attempting to gain access or a greater access to the computing apparatus 100 is a valid user by analyzing a fingerprint pattern of a fingerprint image 120 sensed through a fingerprint sensor 110 of the computing apparatus 100. For example, in a case in which the user inputs a fingerprint to the fingerprint sensor 110 to cancel a lock state of the computing apparatus 100, e.g., to 'unlock' the computing apparatus 100, the computing apparatus 100 compares the fingerprint image 120 obtained through the fingerprint sensor 110 to at least one of registered fingerprint images 142, 144, and 146 stored in a database (DB) 130, and determines whether to cancel the lock state of the computing apparatus 100 based on a result of the comparing. The DB 130 may store registered fingerprint images of at least one finger, and may be included in the computing apparatus 100 and/or may be included in a separate computing apparatus or remote cloud or server, for example.

In an example, a valid user may register, in advance, fingerprint information of the valid user in the computing apparatus 100, and the computing apparatus 100 may store the fingerprint information registered by the valid user in the DB 130 or the example cloud or other server storage. The fingerprint information of the valid user may also be entered through another computing apparatus 100, and transferred to or requested by the computing apparatus 100 of FIG. 1, or otherwise acquired and stored in the DB 130. The registered fingerprint information may be stored in a form of a registered fingerprint image, for example, as color, gray scale, intensity, depth, or black and white images. In another example, the registered fingerprint information of the registered fingerprint images 142, 144, or 146 may be stored as magnitude images, such representative of image information after having been frequency domain transformed or Fourier-Mellin transformed, as non-limiting example, from such color, gray scale, intensity, depth, or black and white images, while noting that the registered fingerprint information may still be stored and later utilized in still other forms. In a fingerprint registration process, a user may register various fingerprint images, for example, the registered fingerprint images 142, 144, and 146. In a fingerprint verification process, the computing apparatus 100 may compare the fingerprint image 120 obtained through the fingerprint sensor 110 to the registered fingerprint images 142, 144, and 146. Here, sizes of the fingerprint image 120 and the registered fingerprint images 142, 144, and 146 may be determined by a recognition region of the fingerprint sensor 110, such as when the fingerprint image 120 and the registered fingerprint images 142, 144, and 146 are acquired by the same or like fingerprint sensor 110, noting that examples are not limited thereto. In an example, due to a limited size of the recognition region of the fingerprint sensor 110, the fingerprint image 120 obtained through the fingerprint sensor 110 and the registered fingerprint images 142, 144, and 146 may include information associated with partial fingerprint regions, i.e., only a partial portion or partial region of a full fingerprint or full fingerprint region. Thus, the fingerprint image 120 and the registered fingerprint images 142, 144, and 146 may each be obtained through the example fingerprint sensor 110 having such limited recognition area or region, and thus, may not include sufficient features to be used to accurately verify the fingerprint image 120 based on the partial fingerprint region represented by the fingerprint image 120 and/or the partial fingerprint regions represented by the respective registered fingerprint images 142, 144, and 146. For example, if an independent fingerprint verification is performed based on a one-to-one comparison of such a partial fingerprint image and a partial registered fingerprint image, which both may have not sufficient differentiating or identifying features, an undesirable result, such as, for example, a false rejection or a false acceptance, may be obtained. An example of such an undesirable result will be described hereinafter with reference to FIGS. 2A and 2B.

Figure 2A:
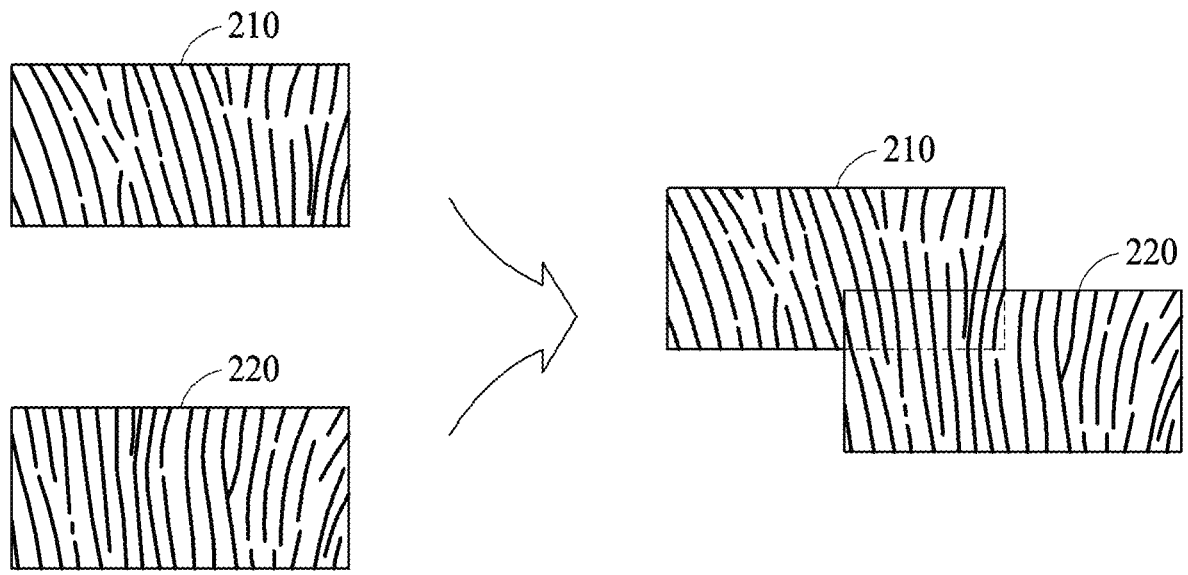
FIGS. 2A and 2B are diagrams illustrating examples of occurrence of a false rejection and a false acceptance.

FIG. 2A is a diagram illustrating an example of occurrence of a false rejection.

Referring to FIG. 2A, in a case in which a size of a matching region, i.e., the region where a match occurs, between a fingerprint image 210 obtained through a fingerprint sensor and a registered fingerprint image 220 is small or of limited area, also corresponding to there being limited differentiatable or identifiable features in either of the fingerprint image 210 and registered fingerprint image 220, it is possible that the fingerprint image 210 may be rejected from being a verified fingerprint due to the small size of the matching region even if the respective fingerprint patterns in the matching region are the same or substantially similar to each other. For example, to prevent false acceptances that may occur when partial fingerprint regions, from which a fingerprint may be less identifiable, are matched between a captured fingerprint and a registered fingerprint, verification methods may require a size of the matching region to be greater than or equal to a preset size before the captured fingerprint can be considered to correspond to a fingerprint verification condition for a determination that the fingerprint verification is successful.

Thus, in the example of FIG. 2A, even though the fingerprint image 210 is of a same finger as the registered fingerprint image, i.e., with the same or substantial similarities in patterns, the fingerprint image 210 may be rejected, and thus a false rejection.

Figure 2B:
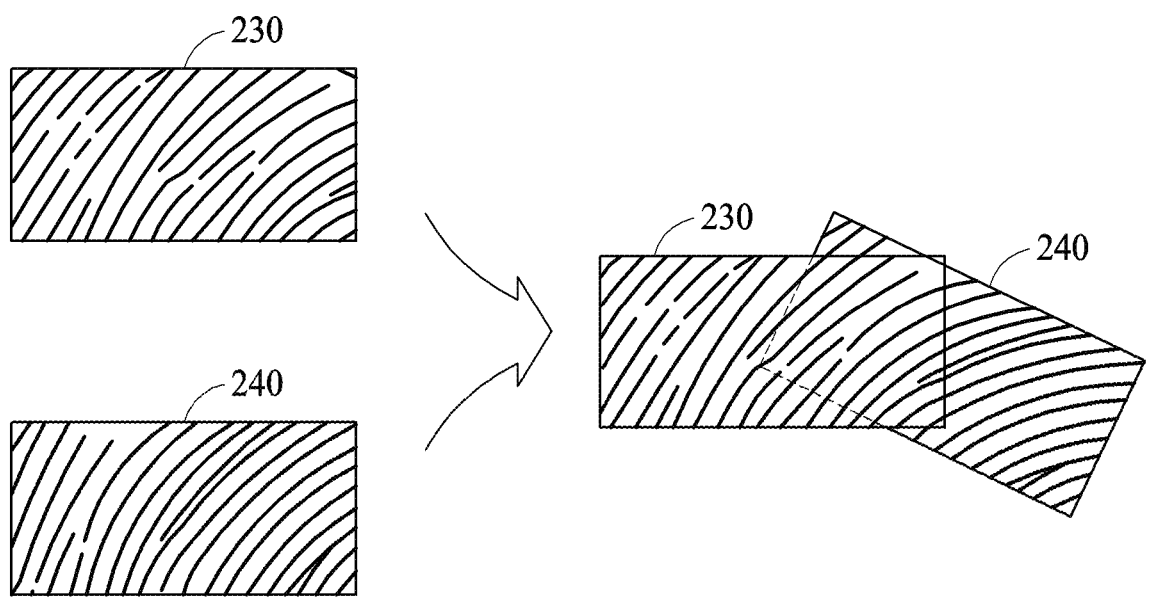

FIG. 2B is a diagram illustrating an example of occurrence of a false acceptance.

Referring to FIG. 2B, in a case in which a fingerprint pattern of a fingerprint image 230 obtained through a fingerprint sensor and a fingerprint pattern of a registered fingerprint image 240 of different fingerprints are each less distinguishable, a matching region between the fingerprint image 230 and the registered fingerprint image 240 may be determined to be large due to respective simple fingerprint patterns of the fingerprint image 230 and the registered fingerprint image 240, and thus, the similarity between the fingerprint image 230 and the registered fingerprint image 240 may be determined to be high and a typical verification method may verify the fingerprint image 230 as a valid fingerprint. However, because the fingerprint patters have such respective simple fingerprint patterns, even when the fingerprints are of different individuals the fingerprint image 230 may be validated due to the large similarity and large matching region, and thus it is highly possible that such false acceptances may occurs.

Such typical false rejections and false acceptances of FIGS. 2A and 2B may adversely affect an accuracy or a recognition rate in the technological implementations of fingerprint verification, and thus represent technological problems, found herein desiring of technological solutions to prevent or more minimize such false rejections and false acceptances from occurring. One or more examples to be described hereinafter may, for example, present verification methods and implementing apparatuses that may resolve such issues described in such typical technological approaches and provide technological approaches for fingerprint verification with greater accurately and/or with greater verification speed, as only examples.

FIG. 3 is a diagram illustrating an example of a fingerprint verification method.

Referring to FIG. 3, a fingerprint verification apparatus performs a fingerprint verification based on determined similarities between a fingerprint image 310 input for the fingerprint verification and each of a plurality of registered fingerprint images 322, 324, 326, and 328. The fingerprint verification apparatus performs the fingerprint verification based on determined respective matching regions between the input fingerprint image 310 and each of the registered fingerprint images 322, 324, 326, and 328, in addition to the determined similarities between the input fingerprint image 310 and each of the registered fingerprint images 322, 324, 326, and 328. For example, a determined matching region may correspond to a determined area or relative size of a matching portion or area between the input fingerprint image and a registered fingerprint image. The fingerprint verification apparatus determines a matching region-based similarity with respect to the input fingerprint image 310. For example, the matching region-based similarity includes similarity information associated with a similarity between the input fingerprint image 310 and one or more registered fingerprint images, and may be related to a region corresponding to the input fingerprint image 310 represented in the matching region-based similarity, e.g., the similarity information may be allocated to a matching region included the matching region-based similarity, such as when the matching region-based similarity is represented as an image. The fingerprint verification apparatus respectively determines similarities and matching regions, or respective overlapping regions, between fingerprint patterns, for each comparing of the input fingerprint image 310 to each of the registered fingerprint images 322, 324, 326, and 328, and with each comparison the fingerprint verification apparatus updates the example matching region-based similarity based on each determined matching region and determined similarities corresponding to the determined matching regions.

For example, in FIG. 3, the reference numeral 330 indicates a visual representation of such a matching region-based similarity. The matching region-based similarity is represented as an integration of respective similarities or respective similarity information between the input fingerprint image 310 and each of registered fingerprint images 322, 324, 326, and 328. The matching region-based similarity includes information associated with the respective matching or overlapping regions and determined respective similarities or similarity information between the input fingerprint image 310 and each of the registered fingerprint images 322, 324, 326, and 328 for the matching regions.

For example, to determine such a matching region-based similarity, the fingerprint verification apparatus determines an example matching region 332 and a corresponding similarity $S_1$ between the input fingerprint image 310 and the registered fingerprint image 322. The fingerprint verification apparatus then updates a matching region-based similarity by allocating the similarity $S_1$ to the matching region 332, of an entire region corresponding to the input fingerprint image 310 in the matching region-based similarity. The matching region-based similarity may be generated or set, e.g., based on an entire region corresponding to the input fingerprint image 310, before, during, or after the determining of the matching region 332 and similarity $S_1$, e.g., with the fingerprint verification apparatus updating the generated or set matching region-based similarity based on the determined matching region 332 and correspondingly determined similarity $S_1$. Here, as an example of the matching region-based similarity being generated or set based on an entire region corresponding to the input fingerprint image 310 (or any of the registered fingerprint images), reference 330 in FIG. 3 illustrates that the matching region-based similarity may have a size or area the same as, or related or relative to, the input fingerprint image 310, with the example matching region 332 being illustrated as occupying or covering the illustrated portion of the whole of the matching region-based similarity, e.g., occupying or covering an illustrated portion of an area corresponding to a whole area of the input fingerprint image 310. In operation 340, the fingerprint verification apparatus may then determine a score for the matching region-based similarity and determine whether that score satisfies a fingerprint verification condition. In response to the score not satisfying the fingerprint verification condition, the fingerprint verification apparatus may proceed to compare the input fingerprint image 310 and the registered fingerprint image 324, i.e., subsequent to the previous comparison with respect to the registered fingerprint image 322. The determined score in operation 340 refers to value, as only an example, that may be used to determine whether the fingerprint verification is successful or not, e.g., based on whether the example value meets a predetermined reference value. With the comparing of the input fingerprint image 310 and the registered fingerprint image 324, the fingerprint verification apparatus determines a matching region 334 and a similarity $S_2$ between the input fingerprint image 310 and the registered fingerprint image 324, and updates the previously determined/updated matching region-based similarity based on the matching region 334 and the similarity $S_2$. For example, the illustrated matching region-based similarity illustrates a bound region (full and dashed lines) that is illustrated as including the similarity $S_2$. As will be discussed in greater detail further below, though there may be additional matching portions between the input fingerprint image 310 and the registered fingerprint image 324 outside the example bound region of matching region 334, e.g., which could overlap with the illustrated bound region of matching region 332 illustrated as including the similarity $S_2$ and/or bound region of matching region 336 illustrated as including the similarity $S_3$, these additional matching portions may not be updated or reflected in the matching region-based similarity with respect to the comparison of the input fingerprint image 310 and the registered fingerprint image 324 if either of the similarity $S_1$ and/or similarity $S_3$ indicate greater similarities than similarity $S_2$. Thus, operation 340 may be repeated again with respect to the matching region-based similarity that has been updated with respect to the matching region 334 and a similarity $S_2$, with the fingerprint verification apparatus determining whether a score determined based on the latest updated matching region-based similarity satisfies the fingerprint verification condition. In response to the score not satisfying the fingerprint verification condition, the fingerprint verification apparatus then performs similarly the forgoing on the next registered fingerprint image 326. In such a case, the matching region-based similarity is again updated again based on a matching region 336 and a similarity $S_3$ between the input fingerprint image 310 and the registered fingerprint image 326. Thus, the fingerprint verification apparatus repeatedly updates the matching region-based similarity by comparing the input fingerprint image 310 and each of the registered fingerprint images 322, 324, 326, through the n-th registered fingerprint image 328 in sequential order until the fingerprint verification condition is satisfied or all registered fingerprint images have been considered. In the above example, due to the sequential determination of whether the fingerprint verification condition is satisfied based on each sequentially determined score corresponding to each updating of the matching region-based similarity, only some of the registered fingerprint images 322, 324, 326, through 328 may ultimately need to be compared to the input fingerprint image 310 before the verification condition is met, e.g., instead of having compare all the registered fingerprint images 322, 324, 326, through 328 to the input fingerprint image 310 before ultimately determining whether the verification condition is met, and thus the fingerprint verification may be terminated more rapidly and faster processing may be enabled if the verification condition is met earlier in the example sequential performances of operation 340.

As noted, in the example of FIG. 3, a determination of whether a fingerprint verification condition is satisfied may be made each time the matching region-based similarity is updated. However, in an example, the initial determination of whether fingerprint verification condition is satisfied may alternatively be determined after a number of updates have been performed or lastly after a final updating of the matching region-based similarity based on the n-th registered fingerprint image 328. For example, all the matching regions and similarities between the input fingerprint image 310 and the registered fingerprint images 322, 324, 326, through 328 may be determined, and the determination of whether the fingerprint verification condition is satisfied may then be made after the matching region-based similarity is finally updated. In another example, all the matching regions and similarities between the input fingerprint image 310 and the registered fingerprint images 322, 324, 326, through 328 may be determined, then the matching region-based similarity may be generated or set based on analyses of all of the determined matching regions and similarities, and then the example operation 340 of FIG. 3 may be performed to determine whether the fingerprint verification condition is satisfied. In another example, an initial fast determination may be made to discern which registered fingerprint images to consider, and in which order, such as based on results of an initial fast, e.g., phase-only correlation (PoC), similarity determination operation with respect to the input fingerprint image 310 and each of the registered fingerprint images, prior to more detailed similarity comparisons being performed, such as the example Fourier-Mellin method described in greater detail with reference to FIGS. 7 through 9. In addition, in the above, examples are discussed where determination of whether a fingerprint verification condition is satisfied, based on a correspondingly determined score, is made each time the matching region-based similarity is updated, sequentially performed after each of a predetermined or set number or all of the matching region-based similarity updates are performed, examples also exist where respective determinations of whether a fingerprint verification condition is satisfied, based on a correspondingly determined score, may be made each time the matching region-based similarity is updated for each of a predetermined or set number of registered fingerprint images, and thereafter the next determining of whether the fingerprint verification condition is satisfied, based on a correspondingly determined score, delayed until a further predetermined or set number, or all, of remaining registered fingerprint images have been considered in respective the matching region-based similarity updates.

Thus, in one or more examples, a result of the fingerprint verification may not be determined based solely on an independently determined similarity between an input fingerprint image and a single registered fingerprint image, but may be determined based on a matching region-based similarity, which may be representative of incrementally combined results of respective comparisons of the input fingerprint image and plural registered fingerprint images, e.g., representative of incrementally combined results of respective comparisons of the input fingerprint image and plural registered fingerprint images in sequential order. Thus, in an example, a probability of occurrence of a false rejection or a false acceptance may be reduced compared to independent verification operations between an input fingerprint and each of two or more registered fingerprints, and thus an accuracy in the fingerprint verification and a recognition rate may be improved in an example.

Figure 5:
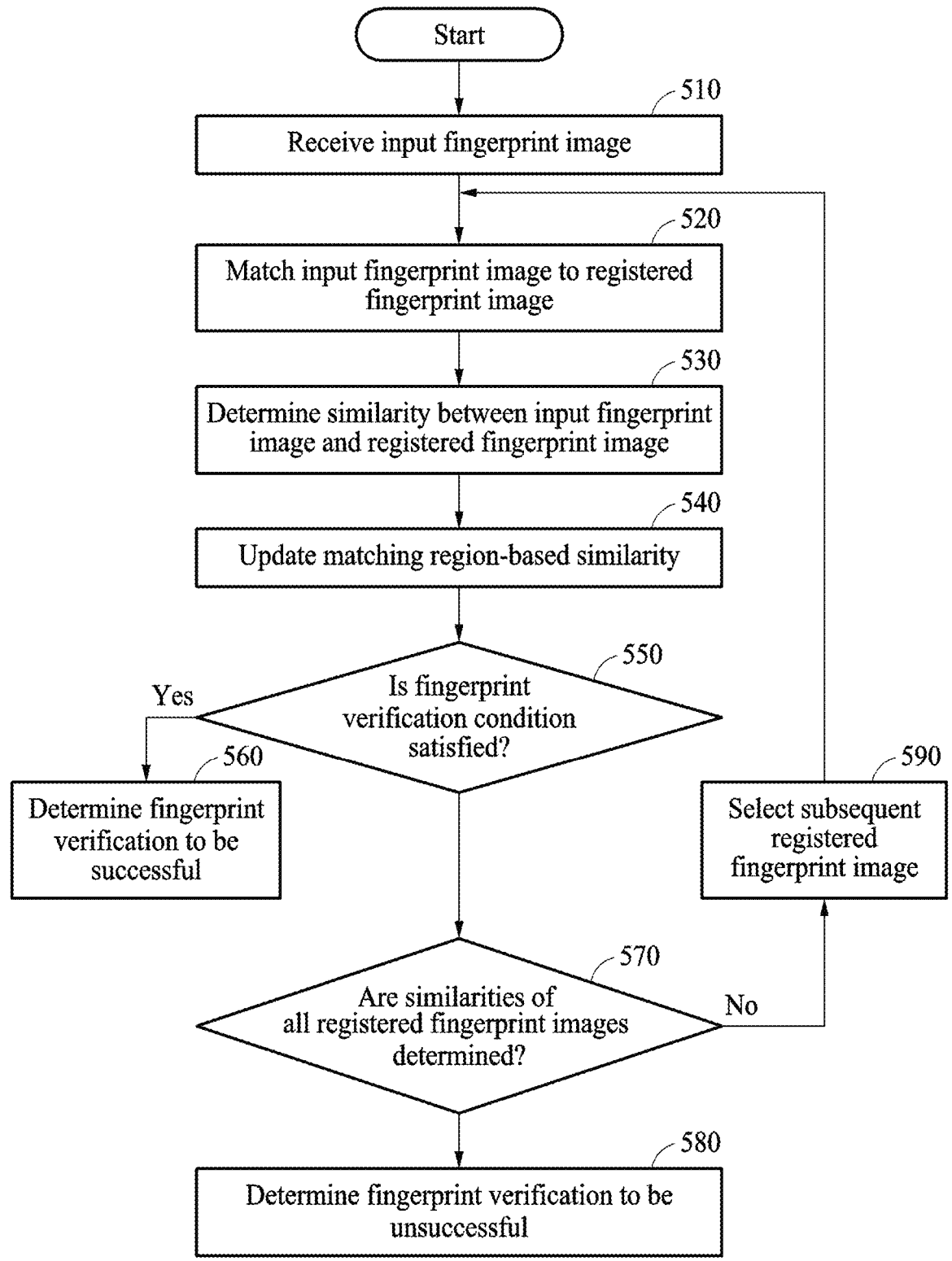
FIG. 5 is a flowchart illustrating an example of a fingerprint verification method.

FIGS. 4 and 5 are flowcharts illustrating an example of a fingerprint verification method. It should be noted that in alternative implementations, the functions/acts noted may occur in other orders, e.g., including operations being performed in a reverse order, than noted in the flowcharts. In addition, for example, two steps or operations illustrated in succession in the examples of FIGS. 4 and 5 may alternatively be executed substantially concurrently, depending upon the functionality/acts involved in such various alternative examples.

Referring to FIG. 4, in operation 410, a fingerprint verification apparatus obtains, e.g., by capturing, reading from a memory, and/or receiving, an input fingerprint image. The input fingerprint image refers to a fingerprint image, e.g., a target on which a fingerprint verification is to be performed, and may be obtained through a fingerprint sensor of the fingerprint verification apparatus, for example, or by a separate or even remote fingerprint sensor. In an example, the fingerprint sensor is configured to sense or capture only an image or features of only a portion of the whole of a finger that positioned relative to or applied to the fingerprint sensor. In addition, in an example, the fingerprint verification apparatus performs a preprocessing operation on the obtained input fingerprint image. The preprocessing operation may be performed to process the input fingerprint image to be in a form, shape, or orientation more suitable for the fingerprint verification by, for example, improving a quality of the input fingerprint image and adjusting a size of the input fingerprint image. The preprocessing operation may include removing noise from the input fingerprint image, increasing a contrast of the input fingerprint image, deblurring the input fingerprint image, performing warping to correct a distortion in the input fingerprint image, binarizing the input fingerprint image, normalizing the size of the input fingerprint image, and/or cropping the input fingerprint image, as only non-limiting examples.

In operation 420, the fingerprint verification apparatus determines a matching region-based similarity based on a determined matching region between the input fingerprint image and at least one registered fingerprint image. The fingerprint verification apparatus selects a registered fingerprint image to be compared to the input fingerprint image from a plurality of registered fingerprint images stored in a DB, and calculates a similarity that indicates how similar the fingerprint pattern of the selected registered fingerprint image is to the fingerprint pattern of the input fingerprint image. Here, a determined high similarity indicates that the fingerprint pattern of the input fingerprint image is relatively considerably similar to the fingerprint pattern of the registered fingerprint image. Likewise, a determined low similarity indicates that the fingerprint pattern of the input fingerprint image is relatively dis-similar to the fingerprint pattern of the registered fingerprint image.

In one example, the fingerprint verification apparatus determines the matching region between the input fingerprint image and the registered fingerprint image using rotation information and translation information determined between the input fingerprint image and the registered fingerprint image, and calculates the similarity between the fingerprint patterns in/for the matching region. The rotation and translation information may correspond to the rotation and translation of either or both of the input fingerprint image and the registered fingerprint image that thereby aligns individual patterns, for example, of the respective fingerprint patterns, such as discussed in greater detail further below with respect to FIG. 6. Thus, the matching region refers to a fingerprint region, corresponding to both the input fingerprint image and the registered fingerprint image, where it is estimated that the input fingerprint image and the registered fingerprint image have a most same or similar fingerprint patterns. A method of determining the matching region-based similarity may include calculating the similarity between the input fingerprint image and the registered fingerprint image, which may be represented numerically, and allocating the calculated similarity to the determined matching region between the input fingerprint image and the registered fingerprint image. For example, in the above example of FIG. 3, the matching region 332 may be determined and the calculated similarity $S_1$ allocated to that matching region 332 in/of the accordingly generated or set matching region-based similarity for the current verification operation with respect to the input fingerprint image and the one or more registered fingerprint images.

In one example, the fingerprint verification apparatus uses, as the similarity between the input fingerprint image and the registered fingerprint image, a feature value obtained by the fingerprint verification apparatus performing a fast Fourier transform (FFT) on the input fingerprint image and the registered fingerprint image. For example, the fingerprint verification apparatus calculates the similarity using an image frequency information-based matching method, such as, for example, a Fourier-Mellin method performed by the fingerprint verification apparatus. The similarity may be determined based on phase correlation information obtained by the fingerprint verification apparatus using the Fourier-Mellin method, or determined by the fingerprint verification apparatus based on the rotation information and the translation information between the input fingerprint image and the registered fingerprint image, in addition to the phase correlation information, as determined by the fingerprint verification apparatus. An example of a method of determining the similarity based on the Fourier-Mellin method will be described in greater detail with reference to FIGS. 7 through 9, noting that the method of determining the similarity between the input fingerprint image and the registered fingerprint image is not limited to the example Fourier-Mellin method, and in various examples various other methods may be used to determine a similarity between the fingerprint patterns of the input fingerprint image and the registered fingerprint image. For example, the similarity may be determined by the fingerprint verification apparatus based on a distribution or a form of feature points extracted by the fingerprint verification apparatus from the fingerprint patterns of the input fingerprint image and the registered fingerprint image. Another method, other than the example, Fourier-Mellin method, may include a method of discovering minutiae, as major feature(s) of a fingerprint, and performing aligning, matching, and similarity determinations based on a determined relationship between the minutiae.

The fingerprint verification apparatus updates the matching region-based similarity based on the calculated similarity. The matching region-based similarity may be initially set to have default values, for example, 0 for an allocated similarity of an entirety of the matching region-based similarity. Thus, the fingerprint verification apparatus may record or update the calculated similarity in a corresponding indicated region of the matching region-based similarity corresponding to the matching region between the input fingerprint image and the registered fingerprint image. A score may be determined for the matching region-based similarity, and in response to the score not satisfying a preset fingerprint verification condition, the fingerprint verification apparatus may proceed to calculate a similarity between the input fingerprint image and another registered fingerprint image, may then update the matching region-based similarity based on the result of that calculated similarity, and may again determine whether a score of the matching region-based similarity satisfies the preset fingerprint condition.

In one example, the fingerprint verification apparatus determines a first similarity corresponding to a first matching region between the input fingerprint image and a first registered fingerprint image. The fingerprint verification apparatus may thus update the matching region-based similarity based on the first similarity and the first matching region. In response to a score determined based on the updated matching region-based similarity not satisfying the fingerprint verification condition, the fingerprint verification apparatus determines a second similarity corresponding to a second matching region between the input fingerprint image and a second registered fingerprint image. Here, the previous updating of the matching region-based similarity based on the first similarity and the first matching region may include allocating the first similarity to a region of the matching region-based similarity representing the first matching region. For example, when the matching region-based similarity has a same area, form, or size as the input fingerprint image, the region of the matching region-based similarity representing the first matching region may merely be an indication of the first matching region in or with respect to the matching region-based similarity, such as demonstrated above with respect to FIG. 3 and the matching region 332 being in/of the accordingly generated or set matching region-based similarity indicated by the reference numeral 330. Thus, with the fingerprint verification apparatus having determined the second similarity corresponding to the second matching region, the fingerprint verification apparatus may update the matching region-based similarity based on the second similarity and the second matching region. The fingerprint verification apparatus updates the matching region-based similarity by allocating the second similarity to a region of the matching region-based similarity representing the second matching region. Here, when an overlap occurs between the first matching region and the second matching region, e.g., they overlap each other with respect to the input fingerprint image, when the second similarity and second matching region are allocated to the matching region-based similarity the fingerprint verification apparatus selectively allocates the greater of the first similarity and the second similarity to the region of the matching region-based similarity corresponding to the overlapping region. The fingerprint verification apparatus further allocates the second similarity to a remaining region of the matching region-based similarity representing the remaining portion of the second matching region in which the overlapping region is not included. According to such an example, for each remaining registered fingerprint that has not been yet been compared to the input fingerprint image, respective comparisons between the input fingerprint image and each of the remaining registered fingerprint images may be performed in sequential order, with the matching region-based similarity being incrementally or continuously updated based on the result of each respective comparison, until the fingerprint verification condition is satisfied or all registered fingerprints have been considered and the fingerprint verification condition is still not met. For example, when the fingerprint verification condition is satisfied after only half of the registered fingerprints have been considered, the fingerprint verification apparatus may cease operations and indicate the verification success in operation 430 without having to perform all such comparisons with all registered fingerprint images in the fingerprint verification process.

In another example, the fingerprint verification apparatus may first determine the respective similarities between the input fingerprint image and each of all of the registered fingerprint images, and may determine a matching region-based similarity based on the determined respective similarities. In this example, the fingerprint verification apparatus determines the respective matching regions and the similarities between the input fingerprint image and each of the registered fingerprint images, and then updates the matching region-based similarity based on the determined matching regions and the determined similarities. Here, in response to any overlapping regions being present between any of the matching regions, the fingerprint verification apparatus selectively allocates, to an example overlapping region, a greatest similarity among similarities corresponding to the corresponding matching regions that overlap each other. Similarities for each of such overlapping regions may similarly be selectively allocated. According to such an example, the respective similarities between the input fingerprint image and each of all of the registered fingerprint images are calculated, and whether the fingerprint verification condition is satisfied is then determined after the matching region-based similarity is finally determined based on the calculated similarities, determined matching regions, and any determined overlapping regions.

In operation 430, the fingerprint verification apparatus determines a result of the fingerprint verification of the input fingerprint image based on the matching region-based similarity. For example, operation 430 may correspond to operation 340 of FIG. 3, and thus discussions above with respect to operation 430 are not repeated here merely for brevity purposes. As noted, in response to the score determined based on the matching region-based similarity satisfying the fingerprint verification condition, the fingerprint verification apparatus determines that the fingerprint verification of the input fingerprint image is successful.

In one example, the fingerprint verification apparatus determines whether the fingerprint verification is successful based on whether a score determined based on the most recent updated matching region-based similarity, e.g., each time the matching region-based similarity is updated, satisfies the fingerprint verification condition. For example, the fingerprint verification apparatus may determine and indicate whether the fingerprint verification is successful or may determine and indicate whether the verification is unsuccessful.

In one example, the fingerprint verification apparatus determines whether a total size of matching regions, represented in the matching region-based similarity, having similarities greater than a threshold value is greater than a threshold size based on the matching region-based similarity, and determines whether the fingerprint verification of the input fingerprint image is successful based on a result of the determining. In response to the total size of the matching regions having similarities greater than the threshold value being greater than the threshold size, the fingerprint verification apparatus determines that the fingerprint verification of the input fingerprint image is successful. In another example, in response to an average value of the allocated similarities of the matching region-based similarity being greater than a threshold value, the fingerprint verification apparatus determines that the fingerprint verification of the input fingerprint image is successful. The fingerprint verification apparatus may indicate the result of the fingerprint verification process either explicitly or implicitly. For example, an explicit indication may include a display or audible announcement of the success of the fingerprint verification process and an implicit indication may include the fingerprint verification apparatus selectively performing or ceasing to perform additional operations of the fingerprint verification apparatus. For example, in response to the fingerprint verification being determined to be successful, the fingerprint verification apparatus may perform the implicit indication by cancelling a lock state of a computing apparatus represented by, connected to, or including the fingerprint verification apparatus, or by assigning, to a user, a right or authority to access one or more functions or features of the example computing apparatus or fingerprint verification apparatus. In a case in which a score, determined based on a matching region-based similarity determined with respect to all registered fingerprint images, does not satisfy the fingerprint verification condition, the fingerprint verification apparatus may determine that the fingerprint verification of the input fingerprint image is unsuccessful. In response to the fingerprint verification being determined to be unsuccessful, the fingerprint verification apparatus may similarly indicate the unsuccessful either explicitly or implicitly, e.g., with an implicit indication being the computing apparatus or verification apparatus maintaining the example lock state or restricting the right or authority of the user for the access to the one or more functions or features of the computing apparatus or fingerprint verification apparatus. Such and/or further examples of methods of determining whether the fingerprint verification is successful and/or unsuccessful will be described in greater detail below with reference to FIG. 11A.

FIG. 5 is a flowchart illustrating an example of a fingerprint verification method. As only an example, FIG. 5 may be a more detailed example of the method described with reference to FIG. 4. Thus, as an example, the above descriptions provided with reference to FIG. 4 are also applicable to corresponding operations of the description provided hereinafter with reference to FIG. 5, and thus repeated descriptions thereof will be omitted here merely for brevity purposes.

Referring to FIG. 5, in operation 510, a fingerprint verification apparatus obtains, e.g., captures, reading, and/or receives, an input fingerprint image. In operation 520, the fingerprint verification apparatus performs a matching operation of the input fingerprint image to a registered fingerprint image. The matching may include rotating and/or translating at least one of the input fingerprint image and the registered fingerprint image, and determining a matching region between the input fingerprint image and the registered fingerprint image.

In operation 530, the fingerprint verification apparatus determines a similarity, based on the matching region determined in operation 520, between the input fingerprint image and the registered fingerprint image. For example, the fingerprint verification apparatus determines a first similarity corresponding to a first matching region between the input fingerprint image and a first registered fingerprint image.

In operation 540, the fingerprint verification apparatus generates, sets, or updates a matching region-based similarity based on the similarity determined in operation 530. For example, the fingerprint verification apparatus may update the generated or set matching region-based similarity based on the matching region between the input fingerprint image and the registered fingerprint image, and based on the determined similarity corresponding to the matching region between the input fingerprint image and the registered fingerprint image. For example, the fingerprint verification apparatus may apply the similarity determined in operation 530 to a previously determined matching region-based similarity with respect to a region of the previously determined matching region-based similarity corresponding to the matching region. Here, in an example where the matching region-based similarity has previously had a previously determined similarly applied to a region of the matching region-based similarity that overlaps with the matching region determined in operation 520, i.e., a corresponding overlapping region, the greater similarity between the previously allocated similarity and the newly determined similarity may be allocated to the corresponding overlapping region.

In operation 550, the fingerprint verification apparatus determines whether a score determined based on the matching region-based similarity satisfies a fingerprint verification condition. For example, the fingerprint verification apparatus calculates a score to determine whether a fingerprint verification is successful based on the matching region-based similarity determined based on the first similarity, and determines whether the calculated score satisfies the fingerprint verification condition. In operation 560, in response to the fingerprint verification condition being satisfied, the fingerprint verification apparatus determines that the fingerprint verification is successful and terminates a fingerprint verification process. Conversely, in operation 570, in response to the fingerprint verification condition not being satisfied, the fingerprint verification apparatus may determine whether similarities of all registered fingerprint images have been determined.

In operation 580, in response to the similarities of all the registered fingerprint images having been determined, the fingerprint verification apparatus determines that the fingerprint verification is unsuccessful and terminates the fingerprint verification process. In operation 590, in response to the determination that the similarities of all the registered fingerprint images have not been determined, the fingerprint verification apparatus selects another or subsequent registered fingerprint image from the registered fingerprint images and then repeats operations 520, 530, 540, 550, and 570 on the selected registered fingerprint image.

For example, the fingerprint verification apparatus calculates a score using the matching region-based similarity determined based on the first similarity. In response to the calculated score not satisfying the fingerprint verification condition, the fingerprint verification apparatus selects a second registered fingerprint image subsequent to the first registered fingerprint image in operation 590. The fingerprint verification apparatus then matches the input fingerprint image to the second registered fingerprint image in operation 520, and determines a second similarity corresponding to a second matching region between the input fingerprint image and the second registered fingerprint image in operation 530. The fingerprint verification apparatus then updates the matching region-based similarity based on the second similarity in operation 540. Here, in response to an overlapping region being determined to be present between the first matching region and the second matching region, the fingerprint verification apparatus allocates the greater similarity between the first similarity and the second similarity to the overlapping region. The fingerprint verification apparatus also allocates the second similarity to the remaining region of the second matching region in which the overlapping region is not included, to complete the updating of the matching region-based similarity. The fingerprint verification apparatus determines whether a score determined by the matching region-based similarity updated based on the second similarity satisfies the fingerprint verification condition in operation 550. In response to the fingerprint verification condition not being satisfied and there still being available registered fingerprint image(s) remaining, the fingerprint verification apparatus selects another or next registered fingerprint image in operation 590, and again performs the operations described above on the selected registered fingerprint image.

Figure 6:
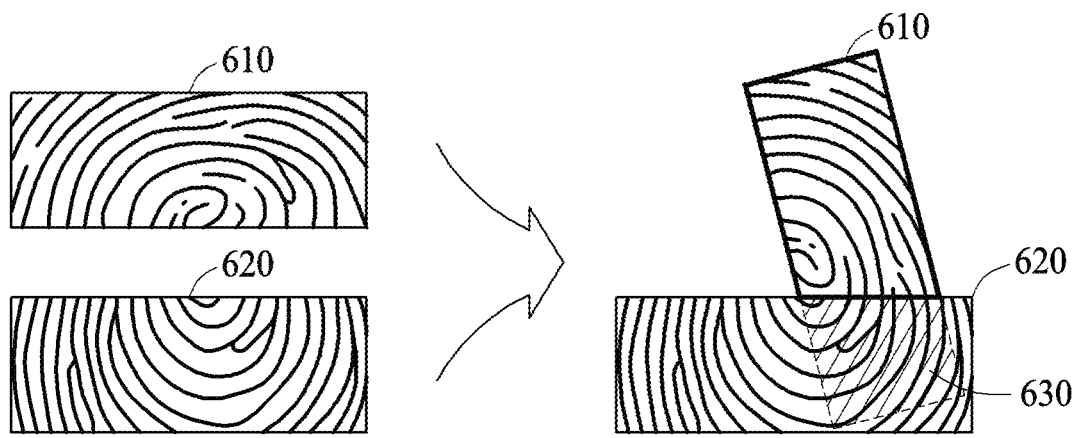
FIG. 6 is a diagram illustrating an example of a matching being performed between an input fingerprint image and a registered fingerprint image.

FIG. 6 is a diagram illustrating an example of matching between an input fingerprint image and a registered fingerprint image.

Referring to FIG. 6, a fingerprint verification apparatus estimates rotation information and translation information of an input fingerprint image 610 and a registered fingerprint image 620, and determines a matching region 630 between the input fingerprint image 610 and the registered fingerprint image 620 using the estimated rotation information and the estimated translation information. In one example, for the matching between the input fingerprint image 610 and the registered fingerprint image 620, a method of matching patterns or features of a pixel intensity of an image in a space, or a method of determining a parameter needed for matching between two images in a frequency domain of the images may be used.

Figure 7:
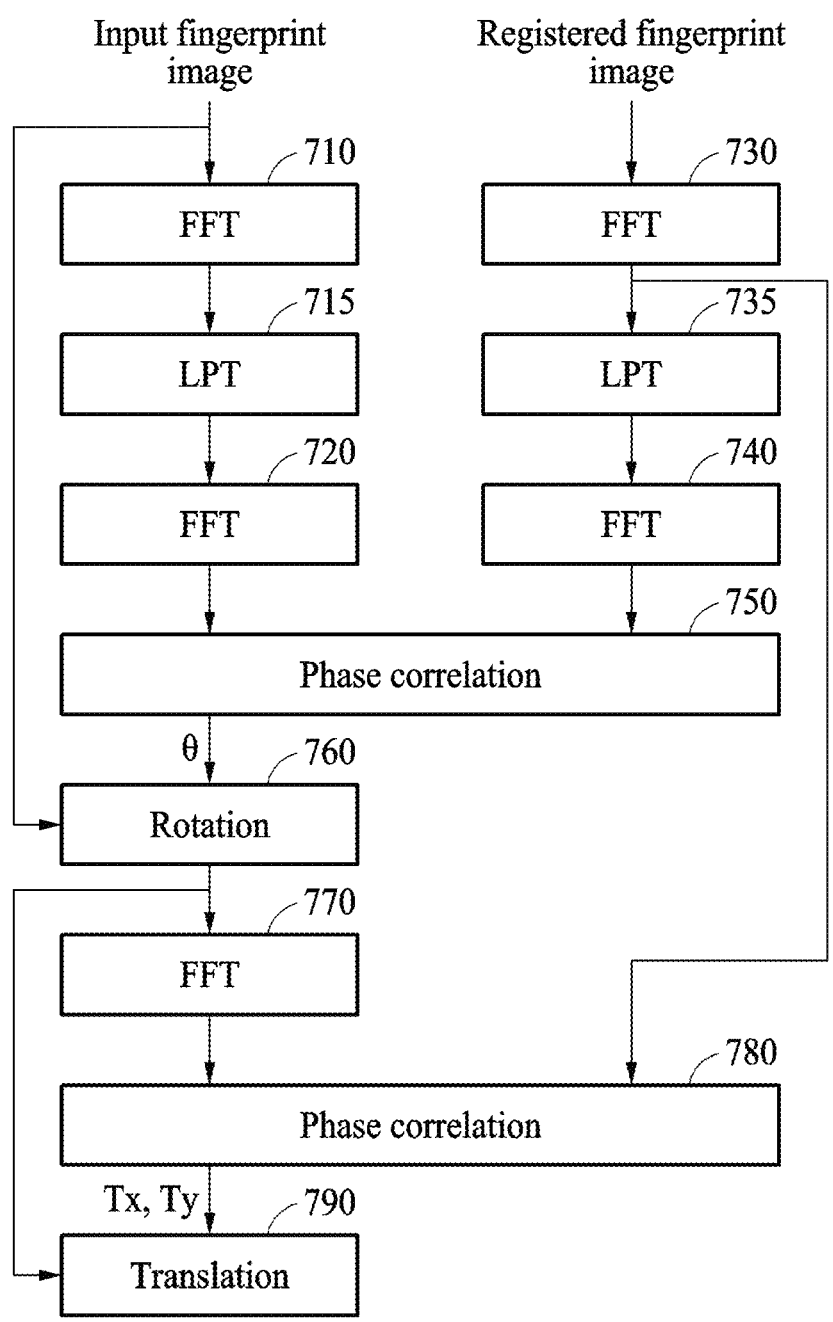

FIG. 7 is a flowchart illustrating an example of a method of determining a similarity between an input fingerprint image and a registered fingerprint image based on a Fourier-Mellin method.

Referring to FIG. 7, in operation 710, a fingerprint verification apparatus transforms information of a spatial domain included in an input fingerprint image to information of a frequency domain using an FFT. In operation 730, the fingerprint verification apparatus transforms information of a spatial domain included in a registered fingerprint image to information of a frequency domain using an FFT. As only an example, the information of the frequency domain may be based on an orthogonal coordinates system that represents information using, for example, two-dimensional (2D) (x, y) coordinates.

In operation 715, the fingerprint verification apparatus transforms a coordinates system of the information of the frequency domain included in the input fingerprint image to a polar coordinates system, for example, such as by using a log-polar transform (LPT). For example, the LPT may be performed on a magnitude value of a pixel in an FFT image obtained through the FFT. In the polar coordinates system, information may be represented by a radius, an angle, or a combination thereof. In operation 735, the fingerprint verification apparatus applies an LPT to the information of the frequency domain included in the registered fingerprint image. The LPT will be described in greater detail with reference to FIG. 8.

FIG. 8 is a diagram illustrating an example of an LPT. Referring to FIG. 8, in an orthogonal coordinates system, concentric circles are set based on a central point 810. The concentric circles are divided into a plurality of regions based on a radius, an angle, or a combination thereof. For example, an LPT maps the plurality of regions in the orthogonal coordinates system to a plurality of regions in a polar coordinates system represented by a radius and an angle. In such an example, the central point 810 in the orthogonal coordinates system may be mapped by the verification apparatus to a region 815 corresponding to (0, 0°) in the polar coordinates system. Similarly, a first region 820, a second region 830, a third region 840, and a fourth region 850 in the orthogonal coordinates system may be mapped by the verification apparatus to a first region 825, a second region 835, a third region 845, and a fourth region 855, respectively, in the polar coordinates system.

The LPT may map a plurality of regions in the orthogonal coordinates system to a plurality of regions in the polar coordinates system represented based on an angle. In such a case, the first region 820 in the orthogonal coordinates system may be mapped by the verification apparatus to a (0°) region in the polar coordinates system. The second region 830 and the third region 840 in the orthogonal coordinates system may be mapped by the verification apparatus to a (36°) region in the polar coordinates system, and the fourth region 840 in the orthogonal coordinates system may be mapped by the verification apparatus to a (324°) region in the polar coordinates system, as only examples.

Referring back to FIG. 7, in operation 720, the fingerprint verification apparatus applies an FFT to the input fingerprint image to which the LPT is applied. In operation 740, the fingerprint verification apparatus applies an FFT to the registered fingerprint image to which the LPT is applied. In operation 750, the fingerprint verification apparatus performs a phase correlation based on a result obtained through the FFT, and detects a peak as a result of performing the phase correlation. A location of the detected peak indicates rotation information between the input fingerprint image and the registered fingerprint image.

In another example, the location of the detected peak may indicate scale information between the input fingerprint image and the registered fingerprint image. For example, one axis of an image obtained through the LPT may correspond to an angle, and the other axis of the image may correspond to a radius, and thus the location of the peak detected through the phase correlation may be indicated by a (a coordinate of the axis corresponding to an angle, a coordinate of the axis corresponding to a radius). The coordinate of the axis corresponding to an angle may indicate the rotation information, and the coordinate of the axis corresponding to a radius may indicate the scale information.

In an example, the fingerprint verification apparatus may not adjust or change a scale of the fingerprint image, or otherwise the fingerprint image may not have a change in scale, and thus a radius may be fixed to a preset value, for example, 1. In such an example, the location of the peak detected through the phase correlation may be represented by the coordinate of the axis corresponding to an angle, and the coordinate of the axis corresponding to an angle may indicate the rotation information.

In one example, the fingerprint verification apparatus detects a peak value by performing the phase correlation, and determines a similarity between the input fingerprint image and the registered fingerprint image based on the peak value. As a size of a region, for example, an overlapping region, in which a fingerprint pattern of the input fingerprint image and a fingerprint pattern of the registered fingerprint image are the same or similar to each other increases, or as similarity between the fingerprint pattern of the input fingerprint image and the fingerprint pattern of the registered fingerprint image increases, the peak value may tend to increase. Based on such a tendency, the fingerprint verification apparatus may determine the similarity between the input fingerprint image and the registered fingerprint image based on the peak value detected through the phase correlation.

The fingerprint verification apparatus rotates the input fingerprint image based on the rotation information θ in operation 760, and applies an FFT on the rotated input fingerprint image in operation 770. In operation 780, the fingerprint verification apparatus performs a phase correlation based on the input fingerprint image to which the FFT is applied in operation 770 and the registered fingerprint image to which the FFT is applied in operation 730. As a result of performing the phase correlation, a peak is detected, and a location of the detected peak indicates translation information (Tx, Ty) between the input fingerprint image and the registered fingerprint image. In operation 790, the fingerprint verification apparatus translates the input fingerprint image rotated in operation 760 based on the translation information (Tx, Ty).

The fingerprint verification apparatus then matches the input fingerprint image and the registered fingerprint image by rotating and translating the input fingerprint image based on the rotation information and the translation information obtained through the example Fourier-Mellin method. In one example, the fingerprint verification apparatus determines a similarity based on a matching region determined by the matching between the rotated and translated input fingerprint image and the registered fingerprint image. The fingerprint verification apparatus may determine the similarity using various methods. For example, in one example, the fingerprint verification apparatus determines the similarity based on a brightness value-based normalized cross correlation method. For example, the fingerprint verification apparatus may determine the similarity based on a correlation obtained through the below Equation 1, for example.

$$ncc(I_1, I_2) = \frac{\sum_{(i,j) \in W} I_1(i, j) \cdot I_2(x+i, y+j)}{\sqrt[2]{\sum_{(i,j) \in W} I_1^2(i, j) \cdot \sum_{(i,j) \in W} I_2^2(x+i, y+j)}} \quad \text{Equation 1}$$

In Equation 1, W denotes a matching region between an image $I_1$ and an image $I_2$, and $ncc(I_1, I_2)$ denotes a normalized cross correlation in the matching region W between the image $I_1$ and the image $I_2$. For example, the image $I_1$ may be a rotated and translated input fingerprint image, and the image $I_2$ may be a registered fingerprint image. i denotes an x-axis coordinate of a pixel in the matching region W, and j denotes a y-axis coordinate of the pixel in the matching region W. x denotes translation information Tx in an x-axis direction, and y denotes translation information Ty in a y-axis direction. $I_1(i, j)$ denotes a pixel value on $(i, j)$ coordinates of the image $I_1$, and $I_2(x+i, y+j)$ denotes a pixel value on $(x+i, y+j)$ coordinates of the image $I_2$. Thus, the correlation $ncc(I_1, I_2)$ in the matching region W that is calculated through Equation 1 above may be used as a similarity between the input fingerprint image and the registered fingerprint image. In such an example, extents of the matching region W may also be determined based on the number of pixels for which a resulting ncc value is greater than a threshold value.

Although rotating and translating an input fingerprint image is described with reference to FIG. 7, the rotating and translating may be performed on a registered fingerprint image based on a result of a phase correlation without the rotating and translating of the input fingerprint image. Alternatively, rotating and translating may be performed on both the input fingerprint image and the registered fingerprint image.

Figure 9:
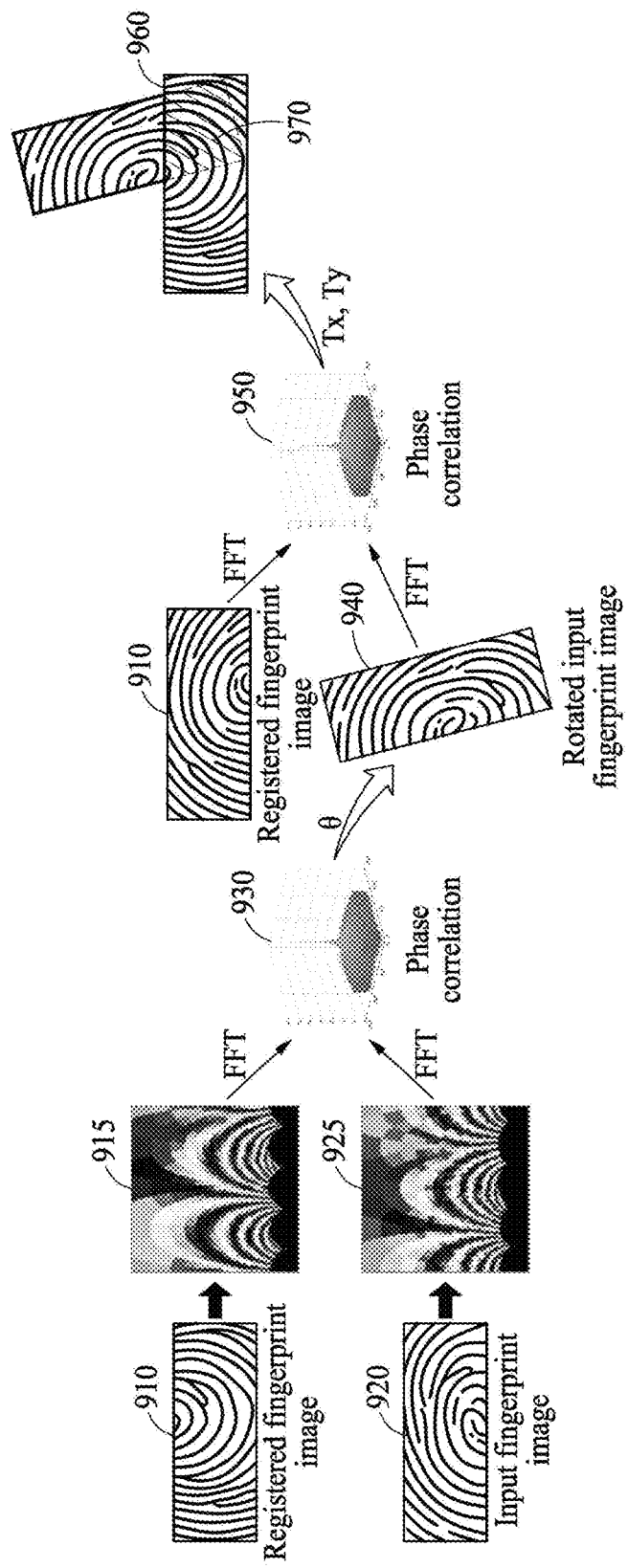

FIG. 9 is a diagram illustrating an example of a method of determining a similarity between an input fingerprint image and a registered fingerprint image based on a Fourier-Mellin method performed by a verification apparatus.

Referring to FIG. 9, a registered fingerprint image 910 is transformed by the verification apparatus to a first LPT image 915 through an FFT and an LPT. An input fingerprint image 920 is transformed by the verification apparatus to a second LPT image 925 through an FFT and an LPT.

Through a phase correlation 930 between the first LPT image 915 and the second LPT image 925 by the verification apparatus, rotation information θ between the registered fingerprint image 910 and the input fingerprint image 920 is determined by the verification apparatus. In one example, a similarity between the registered fingerprint image 910 and the input fingerprint image 920 is determined by the verification apparatus based on a peak value detected by the verification apparatus through the phase correlation 930.

The input fingerprint image 920 is rotated by the verification apparatus based on the rotation information θ determined through the phase correlation 930. In addition, translation information (Tx, Ty) between the registered fingerprint image 910 and the input fingerprint image 920 is determined by the verification apparatus through a phase correlation 950 between an FFT image, which is an image obtained as a result of performing an FFT on the registered fingerprint image 910 by the verification apparatus, and an FFT image, which is an image obtained as a result of performing an FFT on a rotated input fingerprint image 940 by the verification apparatus.

Matching between the registered fingerprint image 910 and the input fingerprint image 920 is performed by the verification apparatus based on the rotation information θ and the translation information (Tx, Ty), and a matching region 970 between the registered fingerprint image 910 and the input fingerprint image 920 is thereby determined by the verification apparatus. In one example, a correlation corresponding to the matching region 970 in a matching image 960 between the registered fingerprint image 910 and the input fingerprint image 920 is calculated by the verification apparatus based on Equation 1 above, and the calculated correlation is determined to be the similarity between the registered fingerprint image 910 and the input fingerprint image 920 by the verification apparatus.

In a matching region-based similarity, the similarity determined based on the peak value detected through the phase correlation 930 or on the correlation calculated through Equation 1 is allocated by the verification apparatus to the matching region 970.

Figure 10:
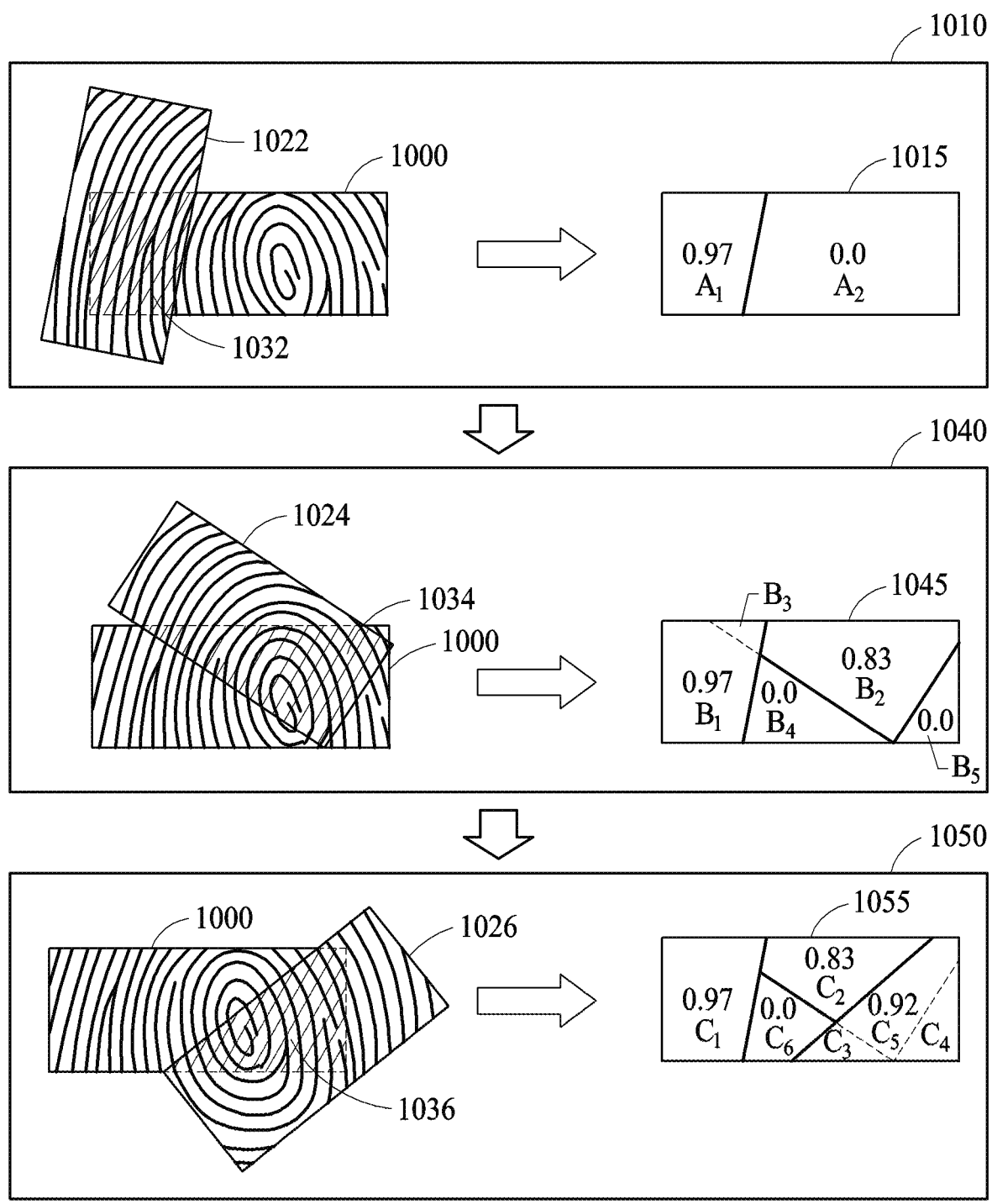
FIG. 10 is a diagram illustrating an example of a method of updating a matching region-based similarity.

FIG. 10 is a diagram illustrating an example of a method of updating a matching region-based similarity.

Referring to FIG. 10, in operation 1010, a fingerprint verification apparatus compares an input fingerprint image 1000 and a first registered fingerprint image 1022, among a plurality of registered fingerprint images, determines a first matching region 1032 and a first similarity between the input fingerprint image 1000 and the first registered fingerprint image 1022, and updates a matching region-based similarity based on the first matching region 1032 and the first similarity. The reference numeral 1015 in FIG. 10 indicates a visualization of the matching region-based similarity determined in operation 1010. Here, in an example where the first similarity is determined to be 0.97, the fingerprint verification apparatus allocates the first similarity 0.97 to the illustrated region $A_1$ corresponding to the first matching region 1032 in the matching region-based similarity 1015. As illustrated in FIG. 10, a default value 0.0 may be allocated to another or remaining region, for example, $A_2$. In an example, the default value 0.0 may have initially been allocated or set for all portions of the matching region-based similarity 1015, so after the updating of the first similarity 0.97 to the illustrated region $A_1$, the remainder of the matching region-based similarity 1015 may still have the default value 0.0.

In one example, the fingerprint verification apparatus determines a score based on the matching region-based similarity 1015, and the fingerprint verification apparatus then determines whether the fingerprint verification is successful based on whether the score satisfies a predetermined fingerprint verification condition. The fingerprint verification condition may include, for example, a requirement that an average value of similarities in one or more regions of the matching region-based similarity 1015, e.g., representing an area equal to or greater than a set 80% of the entire matching region-based similarity 1015 or the entire area of the input fingerprint image 1000, needs to be equal to or greater than a set 0.9. Such fingerprint verification condition requirements may be preset and/or updated by a manufacturer and/or set or selected by a user, such as by the user selecting from different levels or required similarities and areas before verification is considered a success.

In response to the score determined based on the matching region-based similarity 1015 satisfying the fingerprint verification condition, the fingerprint verification apparatus determines that the fingerprint verification is successful and terminates the fingerprint verification process without comparing the input fingerprint image 1000 to another registered fingerprint image. Conversely, in response to the score determined based on the matching region-based similarity 1015 not satisfying the fingerprint verification condition, the fingerprint verification apparatus compares the input fingerprint image 1000 to a second registered fingerprint image 1024, which is different from the first registered fingerprint image 1022, and determines a second matching region 1034 and a second similarity between the input fingerprint image 1000 and the second registered fingerprint image 1024 in operation 1040. In one example, the fingerprint verification condition may be determined based on of the size of the matching region(s), a similarity or similarities indicated in the matching region-based similarity 1015, or a combination of the size of the matching region(s) and the similarity or similarities indicated in the matching region-based similarity 1015.

With respect to determined second matching region and second similarity, the fingerprint verification apparatus updates the matching region-based similarity 1015 based on the determined second matching region 1034 and the determined second similarity. A reference numeral 1045 indicates a visualization of the matching region-based similarity that is updated based on the second matching region 1034 and the second similarity, after having been previously updated with respect to the first matching region 1032 and the first similarity. Here, in an example where the second similarity is determined to be 0.83, the fingerprint verification apparatus thus allocates the second similarity 0.83 to the illustrated region $B_2$ of a region corresponding to the second matching region 1034 in the matching region-based similarity 1045. The illustrated region $B_3$ of the corresponding region is a region matched to both the first registered fingerprint image 1022 and the second registered fingerprint image 1024, and thus corresponds to an overlapping region between the first matching region 1032 and the second matching region 1034. In such a case, the similarity corresponding to the region $B_3$ is determined to be 0.97, which is the greater similarity between the previously allocated similarity 0.97 and the second similarity 0.83. For example, the similarity corresponding to the region $B_3$ may be maintained to be the previously allocated 0.97, i.e., previously allocated based on the first similarity 0.97, without being updated based on the determination that the second similarity is less than the first similarity 0.97. The example default value 0.0 may be maintained for illustrated regions $B_4$ and $B_5$, which have not yet been determined to correspond to matching regions with any registered fingerprint image. The illustrated region $B_1$, corresponding to the previously allocated first similarity 0.97 and the first matching region 1032, is also maintained to have the allocated 0.97 distinct from the allocated second similarity 0.83 allocated for the second matching region 1034.

Similarly, in response to a score determined based on the matching region-based similarity 1045 not satisfying the fingerprint verification condition, the fingerprint verification apparatus compares the input fingerprint image 1000 to a third registered fingerprint image 1026, determines a third matching region 1036 and a third similarity between the input fingerprint image 1000 and the third registered fingerprint image 1026, and updates the matching region-based similarity 1045 based on the third matching region 1036 and the third similarity in operation 1050. Here, the third similarity is determined to be 0.92. The illustrated reference numeral 1055 is a visualization of this latest matching region-based similarity that has been updated based on the third matching region 1036 and the third similarity.

The fingerprint verification apparatus thus allocates the third similarity 0.92 to regions $C_3$, $C_4$, and $C_5$ of a region corresponding to the third matching region 1036 in the matching region-based similarity 1055. Previous allocated similarities corresponding to the regions $C_3$ and $C_4$ were the example default 0.0, and thus are updated to be 0.92, which is a greater value than the default 0.0. The region $C_5$ is a region that is matched to both the second registered fingerprint image 1024 and the third registered fingerprint image 1026, and thus corresponds to an overlapping region between the second matching region 1034 and the third matching region 1036. In such a case, a similarity corresponding to the region $C_5$ is updated to be 0.92, which is the greater value between the previously allocated similarity 0.83 and the third similarity 0.92. The example default value 0.0 is thus maintained for the region $C_6$, which has not yet been determined to correspond to matching regions with any registered fingerprint image. The illustrated region $C_1$, corresponding to the previously allocated first similarity 0.97 and the first matching region 1032, is also maintained to have the allocated 0.97 distinct from the allocated third similarity 0.92 allocated for the third matching region 1036.

As described above, in a matching region-based similarity, respective similarities between an input fingerprint image and each of the registered fingerprint images may be determined with respect to each matching region between the input fingerprint image and each of the registered fingerprint images. Further, each time the input fingerprint image is compared to each of different registered fingerprint images and a corresponding additional matching region is determined, a total matching region of the matching region-based similarity may be incrementally expanded with each matching region-based similarity update.

Thus, when the updating of the matching region-based similarity 1045 is completed based on the third matching region 1036 and the third similarity, the fingerprint verification apparatus determines a score based on an updated matching region similarity 1055, and determines whether the score satisfies the fingerprint verification condition. In response to the score satisfying the fingerprint verification condition, the fingerprint verification apparatus determines that the fingerprint verification process of the input fingerprint image is successful and the fingerprint verification apparatus may indicate the success of the fingerprint verification process. In response to the score not satisfying the fingerprint verification condition, the fingerprint verification apparatus may sequentially perform the same operations described in the foregoing on each remaining registered fingerprint images until the fingerprint verification condition is satisfied. The fingerprint verification apparatus may determine that the fingerprint verification process is unsuccessful when a final score determined based on a finally updated matching region-based similarity, e.g., obtained as a result of having performed such operations on all the registered fingerprint images, does not satisfy the fingerprint verification condition.

Figure 11A:
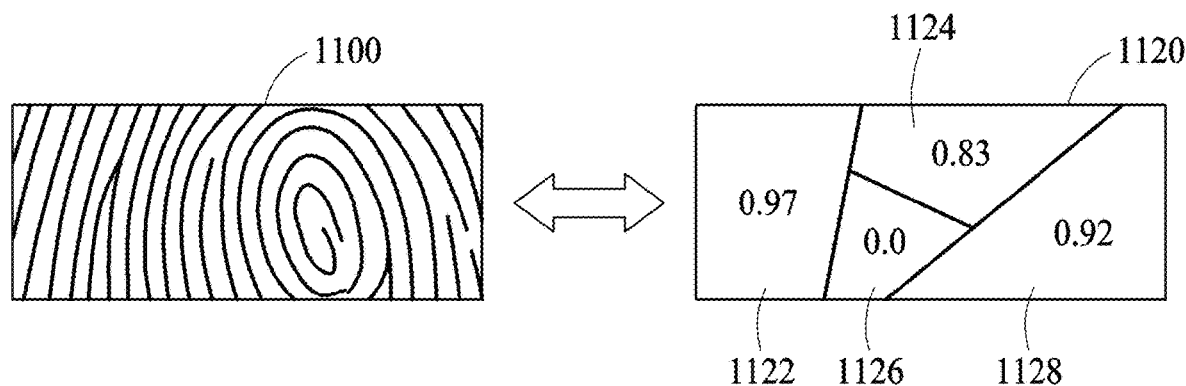
FIGS. 11A and 11B are diagrams illustrating an example of a method of performing a fingerprint verification based on a matching region-based similarity.
Figure 11B:
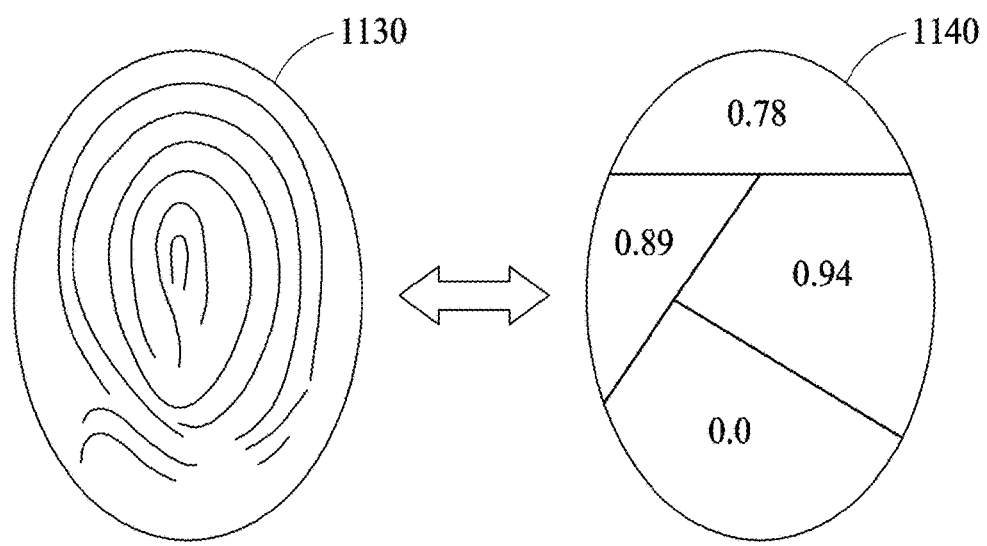

FIGS. 11A and 11B are diagrams illustrating an example of a method of performing a fingerprint verification based on a matching region-based similarity.

Referring to FIG. 11A, a matching region-based similarity 1120 may be embodied as an image having a same resolution as a resolution of an input fingerprint image 1100. For example, in a case in which the resolution of the input fingerprint image 1100 is n×m, in which n denotes a number of pixels in width and m denotes a number of pixels in length, the resolution of the matching region-based similarity 1120 may also be n×m. Here, each of illustrated similarities included in the matching region-based similarity 1120 in FIG. 11A, for example, corresponds to a similarity between the input fingerprint image 1100 and each of the multiple registered fingerprint images. As only an example, each of the registered fingerprint images may also have an n×m resolution.

Here, an input fingerprint image may be provided in the example illustrated rectangular shape, for example, the input fingerprint image 1100 as illustrated in FIG. 11A, or in an oval shape, for example, an input fingerprint image 1130 as illustrated in FIG. 11B. In one example, in a case in which an image of a fingerprint of a user is captured by a fingerprint sensor, integrated in a display, while a finger of the user is touching the display, the resultant input fingerprint image 1130 in the oval shape may be captured as illustrated in FIG. 11B. Alternatively or additionally, a sensing region of the fingerprint sensor may have an oval shape, and the resultant input fingerprint image captured by the fingerprint sensor may have an oval shape. After the aforementioned operations described above to respectively determine the matching region-based similarities of FIGS. 1-10, for example, the matching region-based similarity corresponding to such an oval-shaped input fingerprint image, for example, the input fingerprint image 1130, may be visualized as a matching region-based similarity 1140 illustrated in FIG. 11B, and the fingerprint verification determined based on considerations of the similarities and matching areas represented in the matching region-based similarity 1140, as also discussed above.

Referring back to FIG. 11A, and as an example, determining whether a fingerprint verification condition is satisfied based on the matching region-based similarity 1120 will be described in greater detail below.

In the matching region-based similarity 1120, a first region 1122 is a region associated with a matching region between the input fingerprint image 1100 and a first registered fingerprint image, and 0.97 is the similarity allocated to the first region 1122. Similarities 0.83, 0.0, and 0.92 are similarity values allocated to a second region 1124, a third region 1126, and a fourth region 1128, respectively. The similarity 0.0 may be a default value allocated to the third region 1126 because the third region 1126 does not include a region matched to any of all registered fingerprint images, or due to a determined considerably low similarity to a registered fingerprint image resulting in such a matching region not being determined or resulting in a determination to not adjust the default value because of the considerably low similarity, e.g., when the correspondingly determined similarity fails to meet a predetermined minimum similarity.

In one example, the fingerprint verification apparatus determines whether a fingerprint verification is successful based on whether a size of total of all matching regions, which have similarities that meet a threshold value (e.g., is greater than or equal to the threshold value), meets a threshold size (e.g., is greater than or equal to the threshold size) using the matching region-based similarity. For example, in a case in which the threshold value is 0.90 and the threshold size is A, for example, 4000, the fingerprint verification apparatus determines that the first region 1122 and the fourth region 1128 are the only matching regions whose similarities meet the threshold value, and then determines that the fingerprint verification is successful when a sum of a size of the first region 1122 and a size of the fourth region 1128 meets A. In a case of the matching region-based similarity 1120 is provided as an image, or representable by an image, the sum of the sizes may be determined to be the total number of pixels in the image to which a similarity meeting 0.90 has been allocated.

In another example, the fingerprint verification apparatus determines whether the fingerprint verification is successful based on whether an average value of the top or greatest value N similarities in the matching region-based similarity 1120 meets, e.g., is greater than or equal to, a threshold value. For example, in a case in which N is 100 and the threshold value is 0.95, the fingerprint verification apparatus arranges or considers similarities in the matching region-based similarity 1120 in a descending order and extracts the top 100 similarities in order, and determines that the fingerprint verification is successful when an average value of the extracted 100 similarities meets, e.g., is greater than or equal to, a predetermined threshold value of 0.95.

In still another example, the fingerprint verification apparatus determines whether the fingerprint verification is successful by arranging similarities in the matching region-based similarity 1120 in a descending order and determining whether a top M-th similarity is greater than or equal to a threshold value. For example, in a case in which M is 200 and the threshold value is 0.9, the fingerprint verification apparatus arranges the similarities in the matching region-based similarity 1120 in a descending order, and determines that the fingerprint verification is successful when a top 200th similarity in the order of similarities meets, e.g., is greater than or equal to, 0.9.

In these examples, values of N and M may be predetermined and/or set, adjusted, or updated by a manufacturer, service provider, and/or user, for example. Similarly, such thresholds herein may also be predetermined, such as by a manufacturer, and/or set, adjusted, or updated by the manufacturer, service provider, and/or user.

The fingerprint verification apparatus may determine whether the fingerprint verification is successful and/or may determine whether the fingerprint verification is unsuccessful using various fingerprint verification conditions, and a scope of examples is not limited by the examples described in the foregoing.

Figure 12:
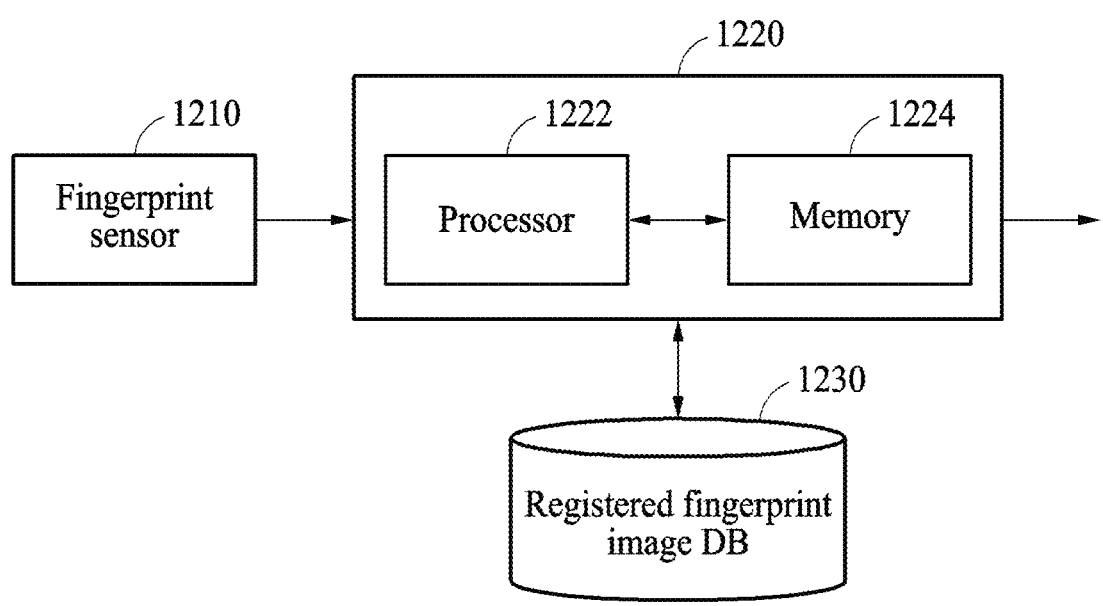
FIG. 12 is a diagram illustrating an example of a fingerprint verification apparatus.

FIG. 12 is a diagram illustrating an example of a fingerprint verification apparatus.

Referring to FIG. 12, a fingerprint sensor 1210 obtains, e.g., captures, reads, and/or receives, fingerprint information of a user, e.g., a user attempting at a fingerprint verification, and generates an input fingerprint image. The input fingerprint image may be transferred or transmitted to a fingerprint verification apparatus 1220, and the fingerprint verification apparatus 1220 is configured to perform the fingerprint verification by comparing the input fingerprint image to at least one registered fingerprint image stored in a registered image DB 1230. The verification process may further include a fingerprint registration process, where the user may register fingerprint images of each of at least one finger, and the registered fingerprint image DB 1230 may be generated and store the registered fingerprint images. The fingerprint registration process may be performed by another fingerprint verification apparatus or another device that is connected to the fingerprint sensor 1210 or another fingerprint sensor for capturing one or more fingerprints to generate and store the registered fingerprint images. The registered fingerprint image DB 1230 may alternatively be included in the fingerprint verification apparatus 1220, just as examples exist where the fingerprint sensor 1210 is included or separate from the fingerprint verification apparatus 1220. The fingerprint verification apparatus 1220 may respectively request or access registered fingerprint images from the registered fingerprint image DB 1230, e.g., during the verification process, or the registered fingerprint image DB 1230 may automatically provide the registered fingerprint images to the fingerprint verification apparatus 1220 based on a command of the fingerprint verification apparatus 1220. Here, though examples are presented for various embodiments, examples are not limited thereto.

The fingerprint verification apparatus 1220 may be configured to perform any one, combination, or all processes, stages, or operations of any one, combination, or all fingerprint verification methods described herein, such as discussed above with respect to FIGS. 1-11B, and provide a result of the fingerprint verification to the user or another server or device, such as through the aforementioned explicit or implicit indications of the results, as non-limiting examples. As a further example, the fingerprint verification apparatus 1220 may provide an example explicit indication of the result of the fingerprint verification through, for example, an output voice, vibration, displayed written character, displayed illustration, or displayed video. However, the indicating of the result is not limited to the examples described in the foregoing, and the fingerprint verification apparatus 1220 may indicate the result in various forms.

The fingerprint verification apparatus 1220 includes at least one processor 1222 and a memory 1224. The memory 1224 is connected to the processor 1222, and stores instructions implementable by the processor 1222, data to be operated by the processor 1222, and/or data processed by the processor 1222 for, during, or as a result of any, any combination, or all of the fingerprint verification processes, stages, operations, and/or methods described herein. The memory 1224 may include, for example, a non-transitory computer-readable medium, for example, a high-speed random access memory and/or a nonvolatile computer-readable storage medium (e.g., at least one disk storage device, a flash memory device, and other nonvolatile solid-state memory devices).

The processor 1222 executes such instructions to control the processor 1222 to perform any one, combination, or all processes, stages, operations, and/or methods described with reference to FIGS. 1 through 11B. Either through such executed instructions or through other hardware implementation, the processor 1222 may be configured to determine a matching region-based similarity based on a determined matching region between the input fingerprint image and the at least one registered fingerprint image, and determines a result of the fingerprint verification performed on the input fingerprint image based on the matching region-based similarity. The processor 1222 may be configured to generate, set, or update the matching region-based similarity based on the matching region between the input fingerprint image and the registered fingerprint image and a similarity corresponding to the matching region between the input fingerprint image and the registered fingerprint image. The processor 1222 determines whether the fingerprint verification is successful based on whether a score determined based on the updated matching region-based similarity satisfies a fingerprint verification condition.

Figure 13:
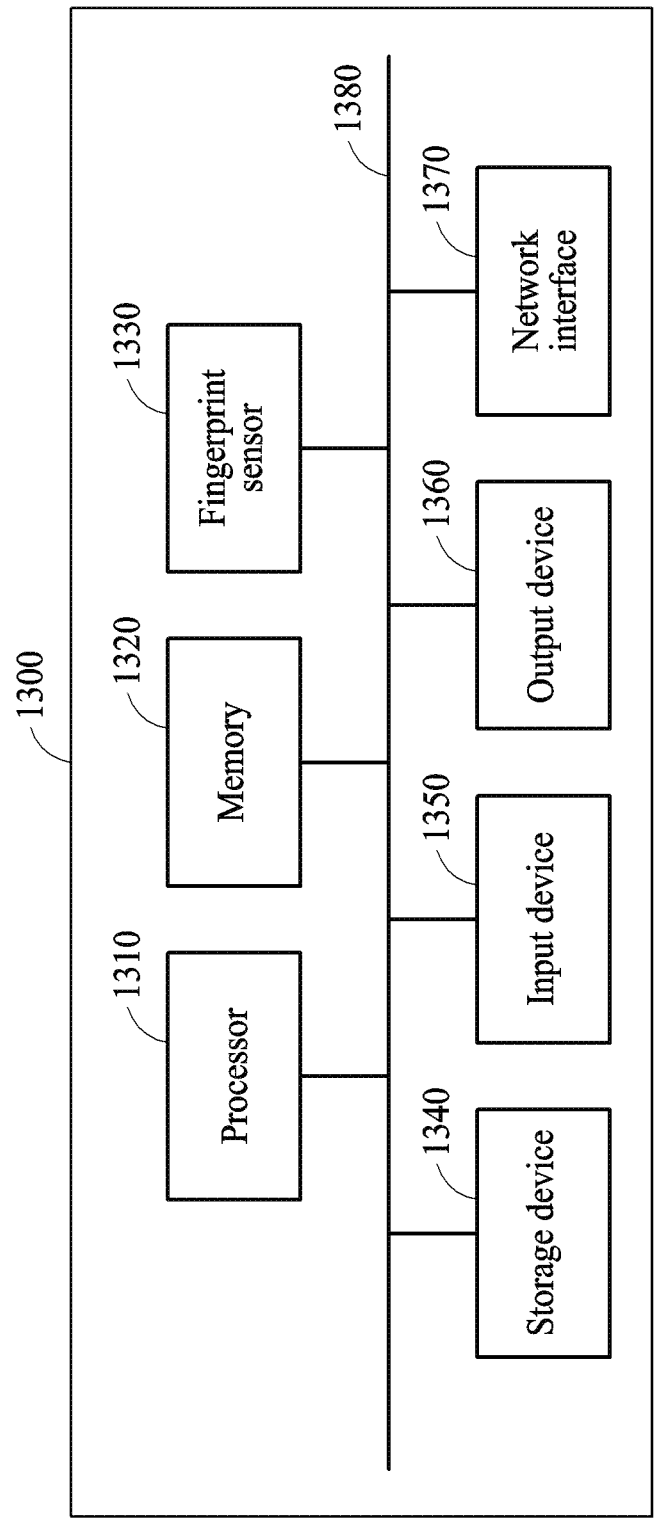
FIG. 13 is a diagram illustrating an example of a computing apparatus.

FIG. 13 is a diagram illustrating an example of a computing apparatus.

A computing apparatus 1300 performs a fingerprint verification process by obtaining a fingerprint image of a user and comparing the obtained fingerprint image to a registered fingerprint image. The computing apparatus 1300 may be configured to include or implement the functionalities of the fingerprint verification apparatus 1220 illustrated in FIG. 12, and thus the descriptions above are applicable to the operation of the computing apparatus 1300, and may not be repeated in full below merely for brevity purposes. In addition, in an example, the computing apparatus 1300 corresponds to the fingerprint verification apparatus 1220. Referring to FIG. 13, the computing apparatus 1300 includes a processor 1310, a memory 1320, a fingerprint sensor 1330, a storage device 1340, an input device 1350, an output device 1360, and a network interface 1370. The processor 1310 of the computing apparatus 1300, as well as the processor 1222 of FIG. 12, may respectively be representative of a single processor, multiple processors, or networked processors or computing devices that share implementations of operations between such processors. Thus, a reference to a processor herein also refers to an example of one or more processors. The processor 1310, the memory 1320, the fingerprint sensor 1330, the storage device 1340, the input device 1350, the output device 1360, and the network interface 1370 may further communicate with one another through an example communication bus 1380.

The processor 1310 is configured to implement functions and instructions in the computing apparatus 1300. For example, the processor 1310 may be configured to execute instructions stored in the memory 1320 or the storage device 1340. Thus, through such instructions and/or through alternative hardware implementations, the processor 1310 is configured to perform any one, combination, or all processes, stages, or operations described with reference to FIGS. 1 through 12.

The memory 1320 stores information to be used for the fingerprint verification process implemented by the computing apparatus 1300. The memory 1320 includes a computer-readable storage medium or a computer-readable storage device. For example, the memory 1320 includes a random access memory (RAM), a dynamic RAM (DRAM), a static RAM (SRAM), or nonvolatile memories in other forms in the technical field to which the present disclosure pertains after an understanding of the present disclosure. The memory 1320 may store the aforementioned instructions to be implemented or executed by the processor 1310 and may store related information generated or relied upon during execution of any software or application being further implemented by the computing apparatus 1300. For example, the memory 1320 may store software or applications whose execution is indicative of success of the fingerprint verification process, such as a mobile banking application or a process of the mobile banking application being executed or authorized upon a successful fingerprint verification.

The fingerprint sensor 1330 may obtain, e.g., capture, read, or receive, an input fingerprint image, e.g., in response to a detection or determination that a fingerprint is being input or provided from a user. The inputting of a fingerprint may include all actions or manipulations performed by the user from which the fingerprint may be obtained. For example, in a case in which a finger of the user comes into contact with a sensing region or the user performs a swipe motion on the sensing region using a finger, the fingerprint sensor 1330 may be configured to sense the fingerprint of the user. In another example, in a case in which the fingerprint sensor 1330 is integrated in a display example, a surface of the display may be embodied as the sensing region and the fingerprint sensor 1330 may be configured to sense a fingerprint from a finger being determined to be in contact with the display. The fingerprint sensor 1330 may be configured to perform various fingerprint information obtaining, e.g., capturing, reading, and/or receiving, methods, for example, an ultrasonic method, a mutual capacitance method, and an infrared image capturing method, as only examples. The fingerprint sensor 1330 may capture, as a fingerprint image, a fingerprint region corresponding to the sensing region of the fingerprint sensor 1330, for example.

The storage device 1340 includes a computer-readable storage medium or a computer-readable storage device. The storage device 1340 stores a DB including registered fingerprint images. In one example, the storage device 1340 stores a greater amount of information than the memory 1320, and stores the information for a long period of time. For example, the storage device 1340 may include, for example, a magnetic hard disk, an optical disc, a flash memory, an erasable programmable read-only memory (EPROM), a floppy disk, and nonvolatile memories in other forms that are well-known in the technical field to which the present disclosure pertains.

The input device 1350 is configured to obtain, e.g., capture, read, and/or receive, input from the user through a tactile, video, audio, and/or touch input. For example, the input device 1350 may include one or more of a keyboard, a mouse, a touchscreen, a microphone, a fingerprint reader, a retinal scanner, and other devices configured to detect an input from a user and transfer the detected input to the computing apparatus 1300.

The output device 1360 is configured to provide the user with an output of the computing apparatus through a visual, auditory, and/or tactile channel. For example, the output device 1360 may provide the user with the output by visualizing information associated with a fingerprint verification. For example, the output device 1360 may include one or more of a liquid crystal display (LCD), a light-emitting diode (LED) display, a touchscreen, a speaker, a vibration generator, and other devices configured to provide an output to the user.

The network interface 1370 may be configured to and/or controlled to communicate with an external device through a wired or wireless network for which the network interface 1370 is configured to interact with. For example, the network interface 1370 may include one or more of an Ethernet card, an optical transceiver, a radio frequency transceiver, and other network interface cards configured to transmit and receive information. The network interface 1370 may wirelessly communicate with the external device through, for example, Bluetooth, WiFi, and a third generation (3G) or fourth generation (4G) communication method.

According to one or more example embodiments described herein, using a matching region-based similarity, a fingerprint verification may be performed based on an integrated matching region and similarity between an input fingerprint image and each of various registered fingerprint images. In addition, a false rejection and a false acceptance that may occur in the fingerprint verification when fingerprint image and registered fingerprint images are independently compared without such a matching region-based similarity consideration may be prevented, and thus an accuracy in the fingerprint verification or a recognition rate may be improved in an example.

The computing apparatus 100, fingerprint sensor 110, processors, fingerprint verification apparatuses, fingerprint sensor 1210, fingerprint verification apparatus 1220, processor 1222, memory 1224, processor 1310, memory 1320, computing apparatus 1300, fingerprint sensor 1330, storage device 1340, input device 1350, output device 1360, network interface 1370, and bus 1380, as only examples, and other apparatuses, hardware modules, devices, and other components described herein with respect to FIGS. 1-13 and that perform operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods demonstrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented fingerprint verification method comprising:
   obtaining an input fingerprint image;
   determining matching regions between the input fingerprint image and registered fingerprint images;
   determining a similarity corresponding to each of the matching regions;
   determining a matching region-based similarity based on the determined matching regions and the determined similarity corresponding to each of the matching regions;
   determining a result of a verification of the input fingerprint image based on the matching region-based similarity; and
   indicating the result of the verification,
   wherein the determining of the similarity corresponding to each of the matching regions includes determining a first similarity corresponding to a first matching region between the input fingerprint image and a first registered fingerprint image, and determining a second similarity corresponding to a second matching region between the input fingerprint image and a second registered fingerprint image, and
   wherein the determining of the matching region-based similarity includes updating the matching region-based similarity based on the first similarity and the second similarity in response to an overlapping region being present between the first matching region and the second matching region.

2. The method of claim 1, wherein the determining of the result of the verification comprises:
   determining a score for the determined matching region-based similarity; and
   determining whether the verification is successful based on whether the score satisfies a predetermined fingerprint verification condition.

3. The method of claim 1, wherein the determining of the result of the verification comprises:
   determining a score for the matching region-based similarity; and
   in response to the score satisfying a predetermined fingerprint verification condition, determining that the verification of the input fingerprint image is successful.

4. The method of claim 3, wherein the determining of the result of the verification further comprises:
   in response to an average similarity value, of similarity values respectively related to at least some of plural matching regions represented in a matching region-based similarity with respect to plural registered fingerprint images, meeting a threshold value, determining that the verification of the input fingerprint image is successful.

5. The method of claim 4, wherein the at least some of the plural matching regions is less than all of the plural matching regions represented in the matching region-based similarity.

6. The method of claim 3, wherein the determining of the result of the verification further comprises:

in response to a score determined based on the matching region-based similarity determined with respect to all registered fingerprint images not satisfying the predetermined fingerprint verification condition, determining that the verification of the input fingerprint image is unsuccessful.

7. A non-transitory computer-readable medium storing instructions, which when executed by a processor, cause the processor to perform the method of claim 1.

8. A processor implemented fingerprint verification method comprising:
  obtaining an input fingerprint image;
  generating a matching region-based similarity to include default similarity values and without representing a matching region;
  determining matching regions between the input fingerprint image and registered fingerprint images;
  determining a similarity corresponding to each of the matching regions;
  determining the matching region-based similarity based on the determined matching regions and the determined similarity corresponding to each of the matching regions;
  determining a result of a verification of the input fingerprint image based on the matching region-based similarity; and
  indicating the result of the verification,
  wherein the determining of the matching region-based similarity includes representing the matching region in the matching region-based similarity and changing, from the default similarity values, similarity values corresponding to the matching region represented in the matching region-based similarity to be the determined similarity.

9. A processor implemented fingerprint verification method comprising:
  obtaining an input fingerprint image;
  determining matching regions between the input fingerprint image and registered fingerprint images;
  determining a similarity corresponding to each of the determined matching regions;
  determining a matching region-based similarity based on the determined matching regions and the determined similarity corresponding to each of the determined matching regions;
  determining a result of a verification of the input fingerprint image based on the matching region-based similarity; and
  indicating the result of the verification,
  wherein the determining of the result of the verification comprises:
    determining a score for the matching region-based similarity;
    in response to the score satisfying a predetermined fingerprint verification condition, determining that the verification of the input fingerprint image is successful; and
    determining whether a total size of one or more matching regions, each having similarities meeting a predetermined threshold value, meets a predetermined threshold size using a matching region-based similarity representing plural matching regions with respect to plural registered fingerprint images, and determining whether the verification of the input fingerprint image is successful based on a result of the determining of whether the total size meets the predetermined threshold size.

10. A fingerprint verification apparatus comprising:
  a processor configured to:
    determine matching regions between an input fingerprint image and registered fingerprint images;
    determine a similarity corresponding to each the matching regions;
    determine a matching region-based similarity based on the determined matching regions and the determined similarity corresponding each of the matching regions;
    determine a result of a verification of the input fingerprint image based on the matching region-based similarity; and
    indicate the result of the verification,
  wherein the processor is further configured to:
    determine a first similarity corresponding to a first matching region between the input fingerprint image and a first registered fingerprint image;
    determine a second similarity corresponding to a second matching region between the input fingerprint image and a second registered fingerprint image; and
    update the matching region-based similarity based on the first similarity and the second similarity in response to an overlapping region being present between the first matching region and the second matching region.

11. The fingerprint verification apparatus of claim 10, wherein the processor is further configured to determine a score based on the matching region-based similarity, and to determine the result of the verification based on whether the score satisfies a fingerprint verification condition.

* * * * *